US012627802B2

(12) United States Patent
Feng et al.

(10) Patent No.: US 12,627,802 B2
(45) Date of Patent: May 12, 2026

(54) DATA ENCODING AND DECODING METHOD AND RELATED DEVICE

(71) Applicant: HUAWEI TECHNOLOGIES CO., LTD., Shenzhen (CN)

(72) Inventors: Yihui Feng, Beijing (CN); Tiansheng Guo, Beijing (CN); Yibo Shi, Beijing (CN); Jing Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/011,813

(22) Filed: Jan. 7, 2025

(65) Prior Publication Data

US 2025/0150588 A1      May 8, 2025

Related U.S. Application Data

(63) Continuation of application No. PCT/CN2023/099648, filed on Jun. 12, 2023.

(30) Foreign Application Priority Data

Jul. 8, 2022      (CN) .......................... 202210801030.7

(51) Int. Cl.
*H04N 19/124*      (2014.01)
*H04N 19/13*      (2014.01)
(Continued)

(52) U.S. Cl.
CPC ........... *H04N 19/124* (2014.11); *H04N 19/13* (2014.11); *H04N 19/196* (2014.11); *G06V 10/52* (2022.01); *G06V 10/7715* (2022.01); *G06V 10/82* (2022.01)

(58) Field of Classification Search
CPC .......... G06N 3/02; G06N 3/045; G06V 10/52; G06V 10/7715; G06V 10/82; H03M 7/40; H04N 19/124; H04N 19/13; H04N 19/196
See application file for complete search history.

(56) References Cited

U.S. PATENT DOCUMENTS

| | | | | |
|---|---|---|---|---|
| 2003/0113026 A1* | 6/2003 | Srinivasan | ............. | H04N 19/52 |
| | | | | 375/E7.199 |
| 2007/0081597 A1* | 4/2007 | Disch | ...................... | H04S 3/008 |
| | | | | 375/242 |

(Continued)

FOREIGN PATENT DOCUMENTS

| | | |
|---|---|---|
| CN | 113315970 A | 8/2021 |
| CN | 113822955 A | 12/2021 |
| CN | 114501013 A | 5/2022 |

OTHER PUBLICATIONS

Zongyu Guo et al: "Soft then Hard: Rethinking the Quantization in Neural Image Compression", arXiv:2104.05168v3 [eess.IV] Jun. 17, 2021, total 16 pages.

(Continued)

*Primary Examiner* — Peter D Le

(57) ABSTRACT

This application provides a data encoding and decoding method and a related device. In the encoding method, side information feature extraction is performed on a first feature map of current data, and quantization processing is performed, to obtain a first quantized feature map. Entropy encoding is performed based on the first quantized feature map, to obtain a first bitstream of the current data. A scaling coefficient is obtained based on the first quantized feature map, scaling processing is performed on a second feature map based on the scaling coefficient, and quantization processing is performed, to obtain a second quantized feature map. Scaling processing is performed on a first prob- (Continued)

800

Perform side information feature extraction on a first feature map of current data, to obtain a side information feature map — 801

Perform quantization processing on the side information feature map, to obtain a first quantized feature map — 802

Perform entropy encoding on the first quantized feature map, to obtain a first bitstream of the current data — 803

Perform scaling processing on a second feature map based on a scaling coefficient, to obtain a scaled feature map — 804

Perform quantization processing on the scaled feature map, to obtain a second quantized feature map — 805

Perform scaling processing on a first probability distribution parameter based on the scaling coefficient, to obtain a second probability distribution parameter — 806

Perform entropy encoding on the second quantized feature map based on the second probability distribution parameter, to obtain a second bitstream of the current data — 807 ability distribution parameter based on the scaling coefficient, to obtain a second probability distribution parameter, and entropy encoding is performed on the second quantized feature map based on the second probability distribution parameter, to obtain a second bitstream of the current data.

20 Claims, 22 Drawing Sheets

(51) Int. Cl.
| | |
|---|---|
| *H04N 19/196* | (2014.01) |
| *G06V 10/52* | (2022.01) |
| *G06V 10/77* | (2022.01) |
| *G06V 10/82* | (2022.01) |

(56) References Cited

U.S. PATENT DOCUMENTS

| | | | | |
|---|---|---|---|---|
| 2017/0034536 | A1* | 2/2017 | Filippov | H04N 19/117 |
| 2020/0027247 | A1* | 1/2020 | Minnen | G06T 9/002 |
| 2020/0097818 | A1* | 3/2020 | Li | G06N 3/0464 |
| 2020/0160565 | A1* | 5/2020 | Ma | H04N 19/60 |
| 2020/0293893 | A1* | 9/2020 | Georgiadis | G06N 3/04 |
| 2020/0304835 | A1* | 9/2020 | Liu | G06N 3/045 |
| 2020/0372686 | A1* | 11/2020 | Wen | H04N 19/91 |
| 2021/0089925 | A1* | 3/2021 | Partovi Nia | G06N 3/063 |
| 2021/0152831 | A1* | 5/2021 | Liu | H04N 19/91 |
| 2021/0358180 | A1* | 11/2021 | Johnston | G06T 9/002 |
| 2022/0083855 | A1* | 3/2022 | Choi | G06N 3/08 |
| 2022/0237740 | A1* | 7/2022 | Lu | G06T 3/4046 |
| 2022/0239944 | A1* | 7/2022 | Zhang | H04N 19/172 |
| 2022/0405978 | A1* | 12/2022 | Lin | G06N 3/08 |
| 2022/0408089 | A1* | 12/2022 | Lin | H04N 19/13 |
| 2023/0262267 | A1* | 8/2023 | Said | H04N 19/463 |
| | | | | 382/232 |
| 2024/0078414 | A1* | 3/2024 | Koyuncu | G06N 3/088 |
| 2024/0095964 | A1* | 3/2024 | Shi | G06N 3/047 |

OTHER PUBLICATIONS

Johannes Balle et al: "Variational Image Compression With a Scale Hyperprior", arXiv:1802.01436v2 [eess.IV] May 1, 2018, total 23 pages.

Ze Cui et al: "Asymmetric Gained Deep Image Compression With Continuous Rate Adaptation",Jun. 20-25, 2021, total 10 pages.

International Search Report and Written Opinion issued in PCT/CN2023/099648, dated Sep. 22, 2023, 9 pages.

* cited by examiner

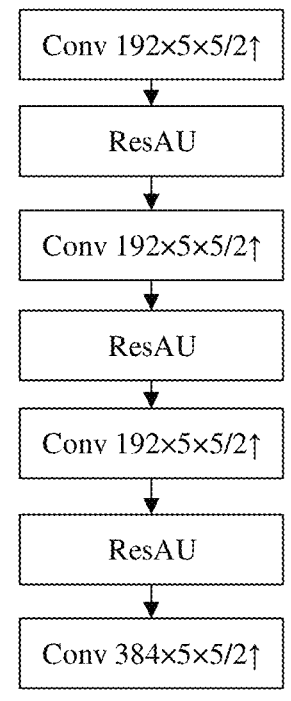

```
┌─────────────────────┐
│  Conv 192×5×5/2↑     │
└─────────────────────┘
          ↓
┌─────────────────────┐
│       ResAU          │
└─────────────────────┘
          ↓
┌─────────────────────┐
│  Conv 192×5×5/2↑     │
└─────────────────────┘
          ↓
┌─────────────────────┐
│       ResAU          │
└─────────────────────┘
          ↓
┌─────────────────────┐
│  Conv 192×5×5/2↑     │
└─────────────────────┘
          ↓
┌─────────────────────┐
│       ResAU          │
└─────────────────────┘
          ↓
┌─────────────────────┐
│  Conv 384×5×5/2↑     │
└─────────────────────┘
```

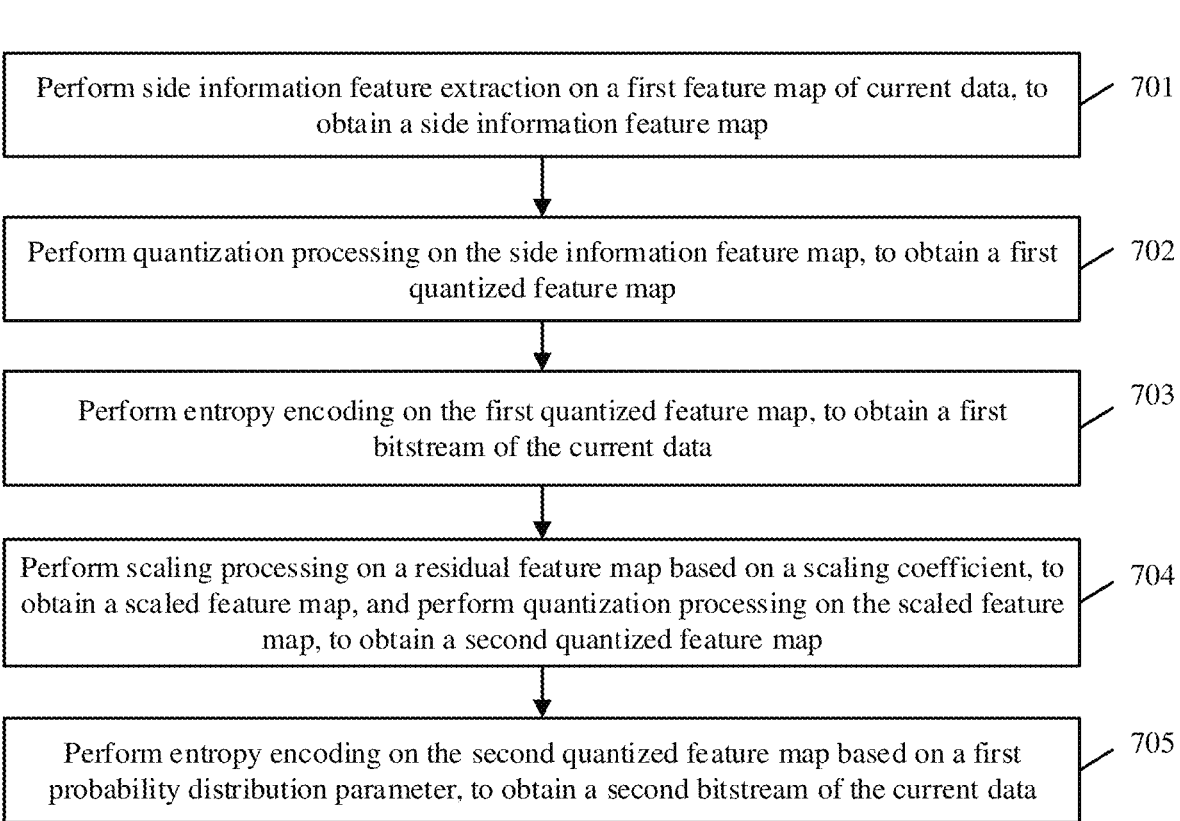

<u>700</u>

Perform side information feature extraction on a first feature map of current data, to obtain a side information feature map — 701

Perform quantization processing on the side information feature map, to obtain a first quantized feature map — 702

Perform entropy encoding on the first quantized feature map, to obtain a first bitstream of the current data — 703

Perform scaling processing on a residual feature map based on a scaling coefficient, to obtain a scaled feature map, and perform quantization processing on the scaled feature map, to obtain a second quantized feature map — 704

Perform entropy encoding on the second quantized feature map based on a first probability distribution parameter, to obtain a second bitstream of the current data — 705

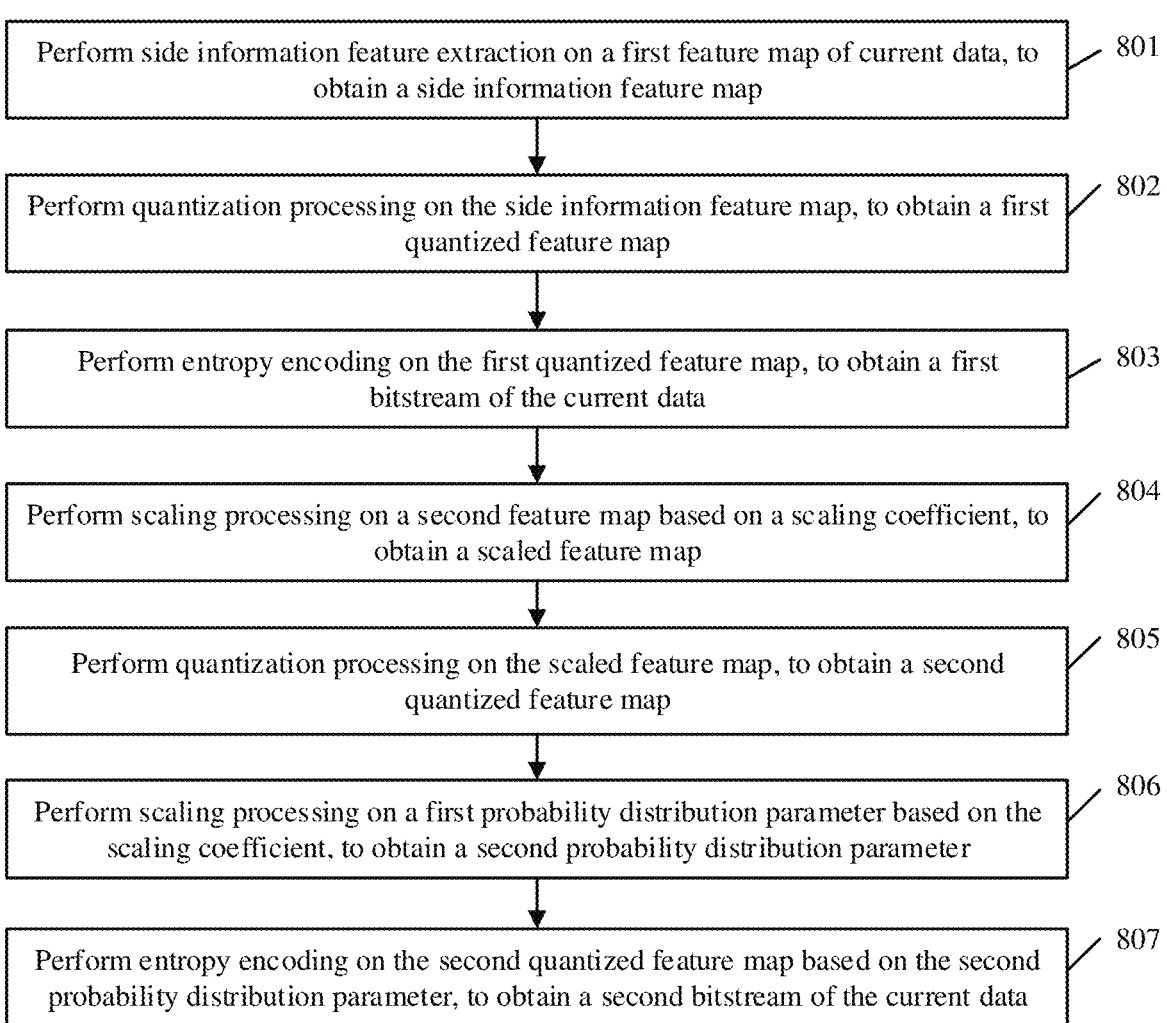

Perform side information feature extraction on a first feature map of current data, to obtain a side information feature map ⟋ 801

Perform quantization processing on the side information feature map, to obtain a first quantized feature map ⟋ 802

Perform entropy encoding on the first quantized feature map, to obtain a first bitstream of the current data ⟋ 803

Perform scaling processing on a second feature map based on a scaling coefficient, to obtain a scaled feature map ⟋ 804

Perform quantization processing on the scaled feature map, to obtain a second quantized feature map ⟋ 805

Perform scaling processing on a first probability distribution parameter based on the scaling coefficient, to obtain a second probability distribution parameter ⟋ 806

Perform entropy encoding on the second quantized feature map based on the second probability distribution parameter, to obtain a second bitstream of the current data ⟋ 807

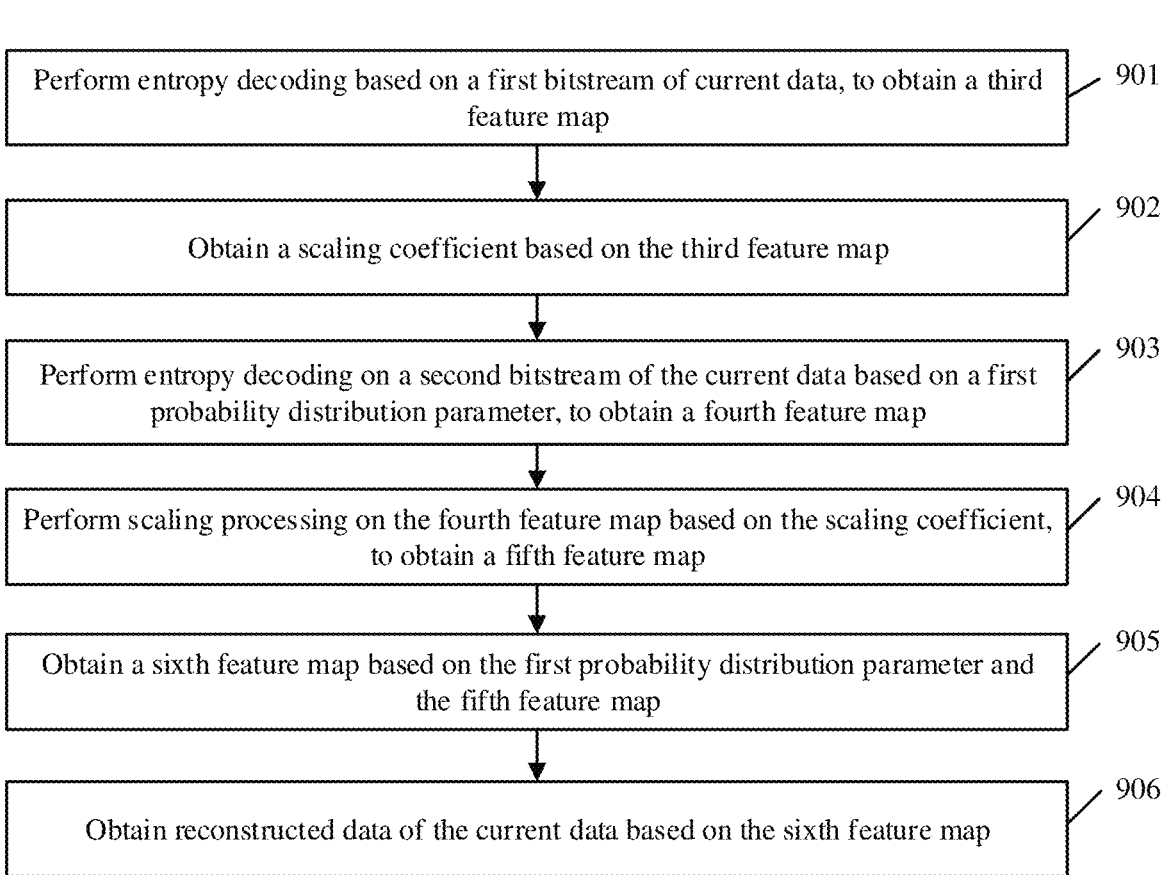

Perform entropy decoding based on a first bitstream of current data, to obtain a third feature map — 901

Obtain a scaling coefficient based on the third feature map — 902

Perform entropy decoding on a second bitstream of the current data based on a first probability distribution parameter, to obtain a fourth feature map — 903

Perform scaling processing on the fourth feature map based on the scaling coefficient, to obtain a fifth feature map — 904

Obtain a sixth feature map based on the first probability distribution parameter and the fifth feature map — 905

Obtain reconstructed data of the current data based on the sixth feature map — 906

FIG. 9

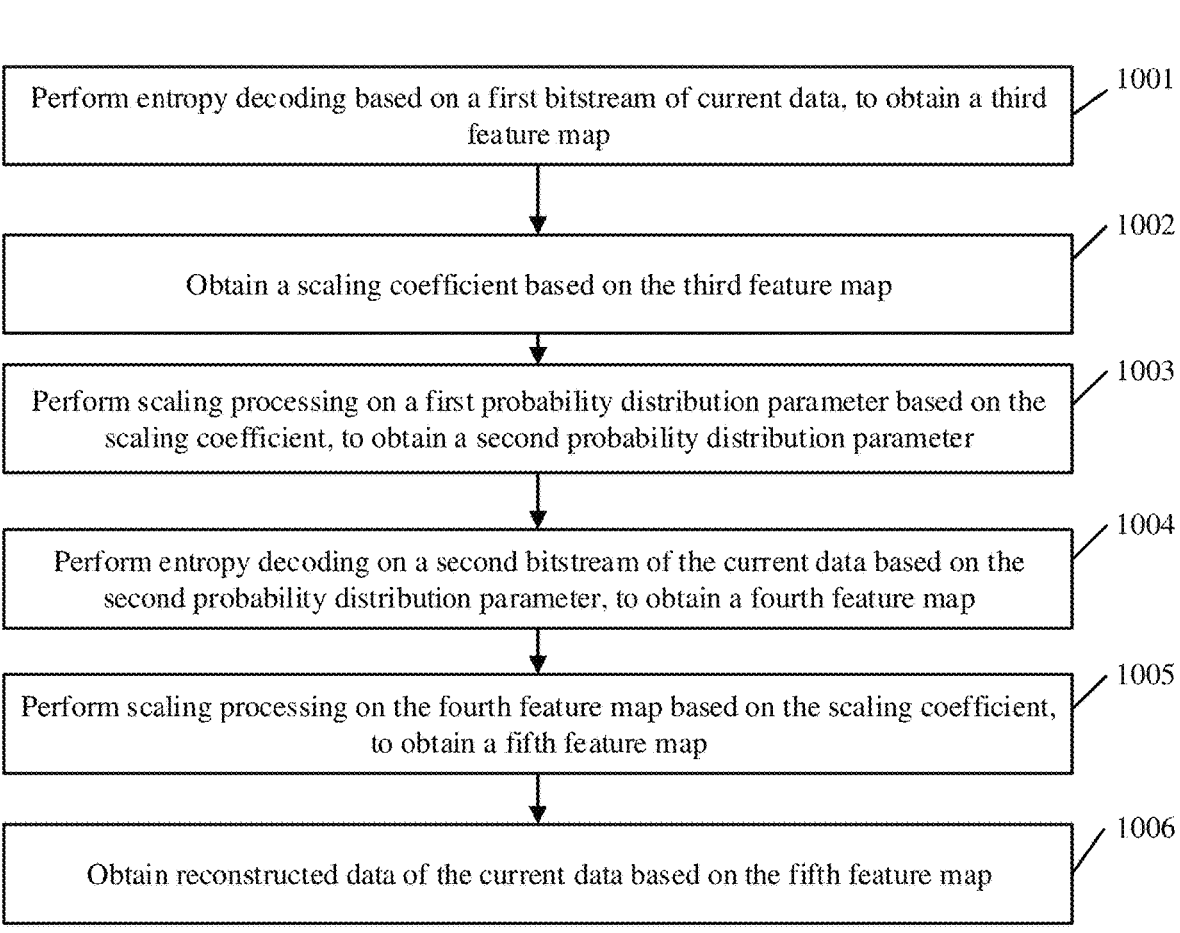

1000

Perform entropy decoding based on a first bitstream of current data, to obtain a third feature map  1001

Obtain a scaling coefficient based on the third feature map  1002

Perform scaling processing on a first probability distribution parameter based on the scaling coefficient, to obtain a second probability distribution parameter  1003

Perform entropy decoding on a second bitstream of the current data based on the second probability distribution parameter, to obtain a fourth feature map  1004

Perform scaling processing on the fourth feature map based on the scaling coefficient, to obtain a fifth feature map  1005

Obtain reconstructed data of the current data based on the fifth feature map  1006

FIG. 10

DATA ENCODING AND DECODING METHOD AND RELATED DEVICE

CROSS-REFERENCE TO RELATED APPLICATIONS

This application is a continuation of International Application No. PCT/CN2023/099648, filed on Jun. 12, 2023, which claims priority to Chinese Patent Application No. 202210801030.7, filed on Jul. 8, 2022. The disclosures of the aforementioned applications are hereby incorporated by reference in their entireties.

TECHNICAL FIELD

Embodiments of this application relate to the data processing field, and in particular, to a data encoding and decoding method and a related device.

BACKGROUND

An objective of a data compression technology is to reduce redundant information in data, so that data can be stored and transmitted in a more efficient format. In other words, data compression is lossy or lossless representation of original data in fewer bits. The data can be compressed because there is redundancy in the data. An objective of the data compression is to reduce a quantity of bits required to represent the data by removing the data redundancy.

How to improve compression performance of a data compression algorithm is an important topic being studied by persons skilled in the art.

SUMMARY

This application provides a data encoding and decoding method and a related device, to improve data compression performance.

According to a first aspect, a data encoding method is provided, and the method is performed by a data encoding apparatus. The method includes the following steps.

Side information feature extraction is performed on a first feature map of current data, to obtain a side information feature map. Then, quantization processing is performed on the side information feature map, to obtain a first quantized feature map. Entropy encoding is performed on the first quantized feature map, to obtain a first bitstream of the current data. Scaling processing is performed on a second feature map based on a scaling coefficient, to obtain a scaled feature map. Quantization processing is performed on the scaled feature map, to obtain a second quantized feature map. The scaling coefficient is obtained based on the first quantized feature map. Scaling processing is performed on a first probability distribution parameter based on the scaling coefficient, to obtain a second probability distribution parameter. Entropy encoding is performed on the second quantized feature map based on the second probability distribution parameter, to obtain a second bitstream of the current data.

The data includes at least one of the following: image data, video data, motion vector data of the video data, audio data, point cloud data, or text data. In this embodiment, the first feature map is a feature map obtained by performing feature extraction on the complete current data, and the second feature map is a feature map obtained based on the current data.

Side information means that existing information Y is used to assist in encoding information X, so that an encoded length of the information X can be shorter. In other words, redundancy in the information X is reduced. The information Y is the side information. In this embodiment of this application, the side information is information that is extracted from the first feature map and that is used to assist in encoding and decoding the first feature map. In addition, a bitstream is a bitstream generated after encoding processing.

In this solution, the entropy encoding is performed based on the first quantized feature map, to obtain the first bitstream of the current data. The first bitstream is a bitstream obtained after the entropy encoding is performed on the first quantized feature map. In addition, the scaling coefficient may be obtained through estimation based on the first quantized feature map. In this way, the scaling processing may be performed on the second feature map based on the scaling coefficient, to obtain the scaled feature map. Then, the quantization processing is performed on the scaled feature map, to obtain the second quantized feature map. The scaling processing is performed on the first probability distribution parameter based on the scaling coefficient, to obtain the second probability distribution parameter. Finally, the entropy encoding is performed on the second quantized feature map based on the second probability distribution parameter, to obtain the second bitstream of the current data. The second bitstream is a bitstream obtained after the entropy encoding is performed on the second quantized feature map. The first bitstream and the second bitstream are used together as a total bitstream of the current data. A data encoding method in a conventional technology includes only a step of performing scaling processing on a feature map. In this solution, the second feature map and the first probability distribution parameter are scaled by using the same scaling coefficient, so that a matching degree between the second probability distribution parameter and the second quantized feature map is higher, thereby improving encoding accuracy of the second quantized feature map, that is, improving data compression performance.

In some possible embodiments of the first aspect, the second feature map is a residual feature map that is of the current data and that is obtained based on a third feature map of the current data and the first probability distribution parameter, and the third feature map is obtained by performing feature extraction on the current data.

In this embodiment, the third feature map is a feature map obtained by performing feature extraction on the complete current data, and the third feature map is different from or the same as the first feature map. A residual of the third feature map, that is, a residual feature map, may be obtained based on the third feature map and the first probability distribution parameter, and the residual feature map is used as the second feature map of the current data.

In this solution, during encoding, after the scaling processing is performed on the residual feature map of the current data to obtain the scaled feature map, the quantization processing is performed on the scaled feature map, so that a quantization loss of the scaled feature map is smaller. That is, an information loss of the second bitstream is smaller. This helps improve data quality of reconstructed data obtained through decoding based on the second bitstream. In addition, compared with an encoding network structure in a conventional technology, in this embodiment of this application, an encoding network structure including the scaling on the residual feature map is used, so that after training of an entire encoding network is completed, network parameters of the entire encoding network can be optimized, including a network for generating the first bitstream and a network for generating the second bitstream. Therefore, with the use of the encoding network structure in this embodiment of this application, a data amount of the total bitstream of the current data can be reduced, and encoding efficiency can be improved. In summary, the scaling on the residual feature map and the scaling on the first probability distribution parameter are combined, so that the data compression performance can be further improved.

In some possible embodiments of the first aspect, the second feature map is a feature map obtained by performing feature extraction on the current data. The first feature map is the same as or different from the second feature map.

In some possible embodiments of the first aspect, the first probability distribution parameter includes a mean and/or a variance.

In some possible embodiments of the first aspect, the first probability distribution parameter is obtained based on the first quantized feature map.

In some possible embodiments of the first aspect, the first probability distribution parameter is a preset probability distribution parameter.

In some possible embodiments of the first aspect, the data encoding method further includes: sending the first bitstream and the second bitstream.

After the first bitstream and the second bitstream of the current data are obtained by using the data encoding method in this solution, the first bitstream and the second bitstream may be sent to another device according to a requirement, so that the another device can process the first bitstream and the second bitstream.

In some possible embodiments of the first aspect, the first bitstream and the second bitstream are stored in a form of bitstream file.

According to a second aspect, this application further provides a data encoding method, and the method is performed by a data encoding apparatus. The method includes the following steps.

Side information feature extraction is performed on a first feature map of current data, to obtain a side information feature map; and quantization processing is performed on the side information feature map, to obtain a first quantized feature map. Entropy encoding is performed on the first quantized feature map, to obtain a first bitstream of the current data. Scaling processing is performed on a residual feature map based on a scaling coefficient, to obtain a scaled feature map, and quantization processing is performed on the scaled feature map, to obtain a second quantized feature map. The residual feature map is obtained based on a second feature map of the current data and a first probability distribution parameter, and the scaling coefficient is obtained based on the first quantized feature map. Entropy encoding is performed on the second quantized feature map based on the first probability distribution parameter, to obtain a second bitstream of the current data.

In this solution, during encoding, after the scaling processing is performed on the residual feature map of the current data to obtain the scaled feature map, the quantization processing is performed on the scaled feature map, so that a quantization loss of the scaled feature map is smaller. That is, an information loss of the second bitstream is smaller. This helps improve data quality of reconstructed data obtained through decoding based on the second bitstream. In addition, compared with an encoding network structure in a conventional technology, in this embodiment of this application, an encoding network structure including the scaling on the residual feature map is used, so that after training of an entire encoding network is completed, network parameters of the entire encoding network can be optimized, including a network for generating the first bitstream and a network for generating the second bitstream. Therefore, with the use of the encoding network structure in this embodiment of this application, a data amount of a total bitstream of the current data can be reduced, and encoding efficiency can be improved. In general, the encoding method in this embodiment can further improve data compression performance.

In some possible embodiments of the second aspect, the first feature map is the same as or different from the second feature map.

In some possible embodiments of the second aspect, the data includes at least one of the following: image data, video data, motion vector data of the video data, audio data, point cloud data, or text data.

In some possible embodiments of the second aspect, the first probability distribution parameter includes a mean and/or a variance.

In some possible embodiments of the second aspect, the first probability distribution parameter is obtained based on the first quantized feature map.

In some possible embodiments of the second aspect, the first probability distribution parameter is a preset probability distribution parameter.

According to a third aspect, this application further provides a data decoding method, and the method is performed by a data decoding apparatus. The method includes the following steps.

Entropy decoding is performed based on a first bitstream of current data, to obtain a third feature map. A scaling coefficient is obtained based on the third feature map. Scaling processing is performed on a first probability distribution parameter based on the scaling coefficient, to obtain a second probability distribution parameter. Entropy decoding is performed on a second bitstream of the current data based on the second probability distribution parameter, to obtain a fourth feature map. Scaling processing is performed on the fourth feature map based on the scaling coefficient, to obtain a fifth feature map. Reconstructed data of the current data is obtained based on the fifth feature map.

If scaling processing is performed on a second feature map and scaling processing is performed on the first probability distribution parameter during data encoding, correspondingly, during data decoding, the first probability distribution parameter and the fourth feature map are processed by using the same scaling coefficient, to ensure decoding accuracy of the fourth feature map. In addition, descaling processing is performed on the fourth feature map based on the scaling coefficient to obtain the fifth feature map, and the reconstructed data may be obtained based on the fifth feature map, so that precision and quality of the reconstructed data are higher. In summary, the scaling on the first probability distribution parameter and the descaling processing on the fourth feature map are combined, so that precision and quality in data decoding can be improved.

In some possible embodiments of the third aspect, the fourth feature map is a residual feature map, the fifth feature map is a scaled residual feature map, and that reconstructed data of the current data is obtained based on the fifth feature map includes:

adding the first probability distribution parameter to the fifth feature map, to obtain a sixth feature map; and obtaining the reconstructed data of the current data based on the sixth feature map.

If a scaling and quantization operation is performed on a residual feature map during data encoding, a data amount of the first bitstream and the second bitstream in the data decoding method in this solution is less than that in a conventional technology. Therefore, a corresponding decoding processing amount is smaller, and this solution can effectively improve decoding efficiency. In addition, an information loss of the second bitstream is smaller, so that data quality of the reconstructed data obtained by using this solution is higher.

In some possible embodiments of the third aspect, the first probability distribution parameter includes a mean and/or a variance.

In some possible embodiments of the third aspect, the data includes at least one of the following: image data, video data, motion vector data of the video data, audio data, point cloud data, or text data.

In some possible embodiments of the third aspect, the data decoding method further includes: receiving the first bitstream and the second bitstream of the current data.

In some possible embodiments of the third aspect, the data decoding method further includes: obtaining the first probability distribution parameter based on the third feature map.

In some possible embodiments of the third aspect, the first probability distribution parameter is a preset probability distribution parameter.

According to a fourth aspect, this application further provides a data decoding method, and the method is performed by a data decoding apparatus. The method includes the following steps.

Entropy decoding is performed based on a first bitstream of current data, to obtain a third feature map. A scaling coefficient is obtained based on the third feature map. Entropy decoding is performed on a second bitstream of the current data based on a first probability distribution parameter, to obtain a fourth feature map. Scaling processing is performed on the fourth feature map based on the scaling coefficient, to obtain a fifth feature map. A sixth feature map is obtained based on the first probability distribution parameter and the fifth feature map. Reconstructed data of the current data is obtained based on the sixth feature map.

If a scaling and quantization operation is performed on a residual feature map during data encoding, a data amount of the first bitstream and the second bitstream in the data decoding method in this solution is less than that in a conventional technology. Therefore, a corresponding decoding processing amount is smaller, and this solution can effectively improve decoding efficiency. In addition, an information loss of the second bitstream is smaller, so that data quality of the reconstructed data obtained by using this solution is higher.

In some possible embodiments of the fourth aspect, the first feature map is the same as or different from the second feature map.

In some possible embodiments of the fourth aspect, the data includes at least one of the following: image data, video data, motion vector data of the video data, audio data, point cloud data, or text data.

In some possible embodiments of the fourth aspect, the first probability distribution parameter includes a mean and/or a variance.

In some possible embodiments of the fourth aspect, the data decoding method further includes: obtaining the first probability distribution parameter based on the third feature map.

In some possible embodiments of the fourth aspect, the first probability distribution parameter is a preset probability distribution parameter.

According to a fifth aspect, this application further provides a data encoder, including a processing circuit, configured to perform the data encoding method according to any one of embodiments of the first aspect or the second aspect.

According to a sixth aspect, this application further provides a computer-readable storage medium. The storage medium stores a bitstream, and the bitstream is generated according to the data encoding method according to any one of embodiments of the first aspect or the second aspect.

According to a seventh aspect, this application further provides a data decoder, including a processing circuit, configured to perform the data decoding method according to any one of embodiments of the third aspect or the fourth aspect.

According to an eighth aspect, this application further provides a computer program product, including program code. When the program code is executed on a computer or a processor, the computer program product is configured to perform the method according to any one of embodiments of the first aspect, the second aspect, the third aspect, or the fourth aspect.

According to a ninth aspect, this application further provides a data encoder, including:

one or more processors; and a computer-readable storage medium, coupled to the one or more processors, where the computer-readable storage medium stores a program, and when the program is executed by the one or more processors, the data encoder is enabled to perform the data encoding method according to any one of embodiments of the first aspect or the second aspect.

According to a tenth aspect, this application further provides a data decoder, including:

one or more processors; and a computer-readable storage medium, coupled to the one or more processors, where the computer-readable storage medium stores a program, and when the program is executed by the one or more processors, the data decoder is enabled to perform the data decoding method according to any one of embodiments of the third aspect or the fourth aspect.

According to an eleventh aspect, this application further provides a computer-readable storage medium, including program code. When the program code is executed by a computer device, the computer-readable storage medium is configured to perform the method according to any one of embodiments of the first aspect, the second aspect, the third aspect, or the fourth aspect.

According to a twelfth aspect, this application further provides a computer-readable storage medium, storing a bitstream including program code. When the program code is executed by one or more processors, a decoder is enabled to perform the data decoding method according to any one of embodiments of the third aspect or the fourth aspect.

According to a thirteenth aspect, this application further provides a chip. The chip includes a processor and a data interface, and the processor reads, through the data interface, instructions stored in a memory, to perform the method according to any one of embodiments of the first aspect, the second aspect, the third aspect, or the fourth aspect.

Optionally, in an implementation, the chip may further include a memory, the memory stores instructions, and the processor is configured to execute the instructions stored in the memory. When the instructions are executed, the processor is configured to perform the method according to any one of embodiments of the first aspect, the second aspect, the third aspect, or the fourth aspect.

BRIEF DESCRIPTION OF DRAWINGS

The following describes accompanying drawings used in embodiments of this application.

FIG. 5E is a diagram of a structure of a decoding network according to an example embodiment of this application;

FIG. 5F is a diagram of a structure of a non-linear unit according to an example embodiment of this application;

FIG. 7 is a schematic flowchart of a data encoding method according to an example embodiment of this application;

FIG. 8 is a schematic flowchart of another data encoding method according to an example embodiment of this application;

FIG. 9 is a schematic flowchart of a data decoding method according to an example embodiment of this application; and FIG. 10 is a schematic flowchart of another data decoding method according to an example embodiment of this application.

DESCRIPTION OF EMBODIMENTS

Figure 1A:
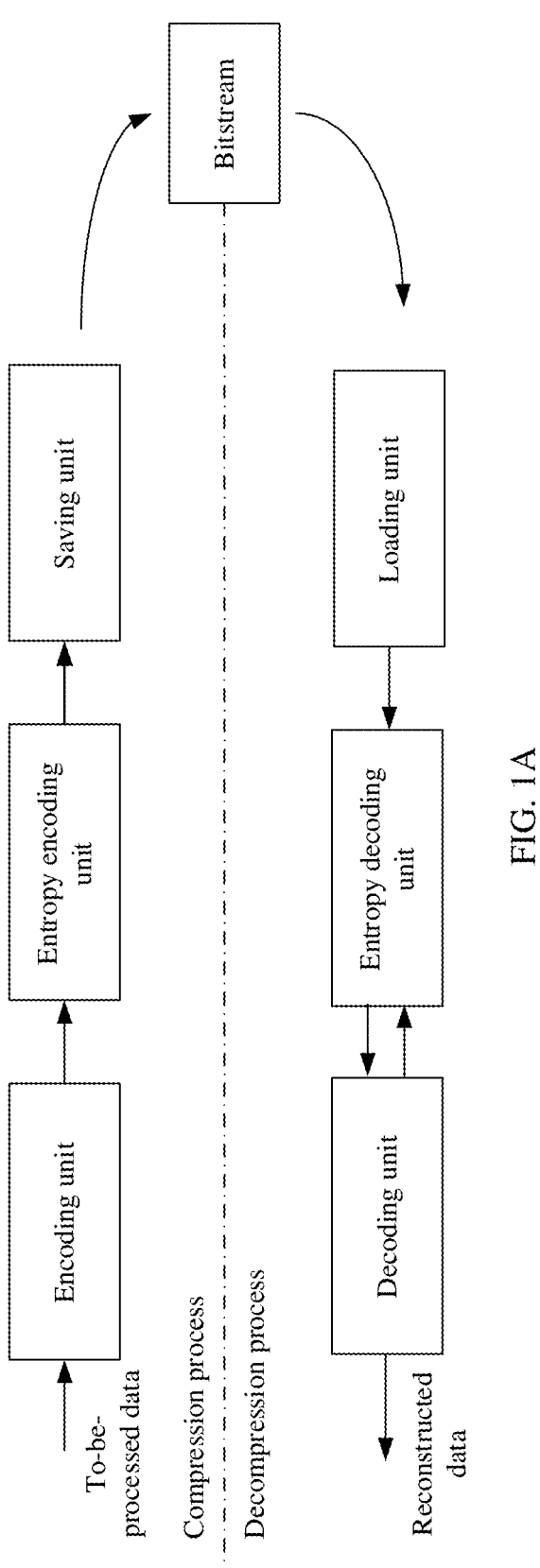
FIG. 1A is a diagram of an architecture of a data coding system according to an example embodiment of this application.

The following describes technical solutions in this application with reference to accompanying drawings.

Embodiments of this application relate to an application. Therefore, for ease of understanding, the following first describes related concepts such as related terms in embodiments of this application.

In embodiments of this application, an expression such as "example" or "for example" represents giving an example, an illustration, or a description. Any embodiment or implementation scheme described as an "example" or "for example" in this application shall not be explained as being more preferred or having more advantages than another embodiment or implementation scheme. To be precise, use of the expression such as "example" or "for example" is intended to present a relative concept in a specific manner.

In embodiments of this application, "at least one" means one or more, and "a plurality of" means two or more. "At least one of the following items (pieces)" or a similar expression thereof indicates any combination of these items, including a single item (piece) or any combination of a plurality of items (pieces). For example, at least one of a, b, or c may indicate: a, b, c, (a and b), (a and c), (b and c), or (a, b, and c), where a, b, and c may be singular or plural. The term "and/or" describes an association relationship between associated objects, and indicates that at least three relationships may exist. For example, A and/or B may indicate the following three cases: Only A exists, both A and B exist, and only B exists, where A and B may be singular or plural. The character "/" generally indicates an "or" relationship between the associated objects. Sequence numbers of steps (for example, step S1 and step S21) in embodiments of this application are merely used to distinguish between different steps, and do not limit a performing sequence of the steps.

In addition, unless otherwise specified, ordinal numbers such as "first" and "second" in embodiments of this application are used to distinguish between a plurality of objects, but are not intended to limit an order, a time sequence, priorities, or degrees of importance of the plurality of objects. For example, a first device and a second device are merely for ease of description, and do not indicate a difference of the first device and the second device in terms of a structure and a degree of importance. In some embodiments, the first device and the second device may alternatively be the same device.

According to the context, the term "when" used in the following embodiments may be interpreted as a meaning of "if", "after", "in response to determining", or "in response to detecting". The following descriptions are merely optional embodiments of this application, but are not intended to limit this application. Any modification, equivalent replacement, improvement, or the like made within the concept and principle of this application shall fall within the protection scope of this application.

For ease of understanding, terms and concepts related to embodiments of this application are first described.

(1) Quantization

Quantization is used to change continuous signals to discrete signals. In a compression process, quantization means changing continuous features to discrete features. In entropy encoding, probability values of a probability distribution are usually changed from continuous values to discrete values.

(2) Entropy Encoding

Entropy encoding is an encoding process in which no information is lost according to an entropy principle. Information entropy is an average amount of information in a source (a measure of uncertainty). Common entropy encoding includes: Shannon coding, Huffman coding, run-length coding, Lempel-Ziv-Welch (LZW) encoding, and arithmetic coding. An LZW encoding algorithm, also referred to as a string table compression algorithm, is to implement compression by establishing a string table and using short code to represent a long string.

(3) Neural Network

A neural network may include a neuron. The neuron may be an operation unit that uses xs and an intercept of 1 as an input. An output of the operation unit may be as follows:

$$h_{W,b}(x) = f(W^T x) = f\left(\sum_{s=1}^{n} W_s x_s + b\right) \tag{1-1}$$

Herein, s=1, 2, . . . , or n, n is a natural number greater than 1, Ws is a weight of xs, b is a bias of the neuron, and f is an activation function of the neuron, and is used to introduce a non-linear feature into the neural network to convert an input signal in the neuron into an output signal. The output signal of the activation function may be used as an input of a next convolutional layer. The activation function may be a Sigmoid function. The neural network is a network formed by linking a plurality of single neurons together. That is, an output of a neuron may be an input of another neuron. An input of each neuron may be connected to a local receptive field of a previous layer to extract a feature of the local receptive field. The local receptive field may be a region including several neurons.

(4) Deep Neural Network

A deep neural network (DNN), also referred to as a multi-layer neural network, may be understood as a neural network having a plurality of hidden layers. The DNN is divided based on locations of different layers, so that the neural network in the DNN may be classified into three types: an input layer, a hidden layer, and an output layer. Generally, a first layer is the input layer, a last layer is the output layer, and a middle layer is the hidden layer. Layers are fully connected to each other. To be specific, any neuron at an $i^{th}$ layer is necessarily connected to any neuron at an $(i+1)^{th}$ layer.

Although the DNN seems complex, it is not complex in terms of work at each layer. Simply speaking, the DNN is the following linear relationship expression: $\vec{y} = a(W\vec{x} + \vec{b})$, where $\vec{x}$ is an input vector, $\vec{y}$ is an output vector, $\vec{b}$ is an offset vector, W is a weight matrix (also referred to as a coefficient), and a( ) is an activation function. At each layer, the output vector $\vec{y}$ is obtained by performing such a simple operation on the input vector x. Because there are a large quantity of layers in the DNN, there are also a large quantity of coefficients W and offset vectors $\vec{b}$. Definitions of these parameters in the DNN are as follows: The coefficient W is used as an example. It is assumed that in a DNN having three layers, a linear coefficient from a fourth neuron at a second layer to a second neuron at a third layer is defined as $$W_{24}^3.$$

The superscript 3 represents a layer at which the coefficient W is located, and the subscript corresponds to an output third-layer index 2 and an input second-layer index 4.

In conclusion, a coefficient from a $k^{th}$ neuron at an $(L-1)^{th}$ layer to a $j^{th}$ neuron at an $L^{th}$ layer is defined as $$W_{jk}^L.$$

It should be noted that there is no parameter W for the input layer. In the deep neural network, more hidden layers make the network more capable of describing a complex case in the real world. Theoretically, a model with more parameters has higher complexity and a larger "capacity". It indicates that the model can complete a more complex learning task. Training the deep neural network is a process of learning a weight matrix, and a final objective of the training is to obtain a weight matrix of all layers of the trained deep neural network (a weight matrix formed by vectors W at many layers).

(5) Convolutional Neural Network

A convolutional neural network (CNN) is a deep neural network with a convolutional structure. The convolutional neural network includes a feature extractor that includes a convolutional layer and a subsampling layer, and the feature extractor may be considered as a filter. The convolutional layer is a neuron layer that is in the convolutional neural network and that performs convolution processing on an input signal. At the convolutional layer of the convolutional neural network, one neuron may be connected only to some adjacent-layer neurons. One convolutional layer usually includes several feature planes, and each feature plane may include some neurons that are in a rectangular arrangement. Neurons of a same feature plane share a weight. The shared weight herein is a convolution kernel. Weight sharing may be understood as that an image information extraction manner is irrelevant to a location. The convolution kernel may be initialized in a form of random-size matrix. In a process of training the convolutional neural network, the convolution kernel may obtain an appropriate weight through learning. In addition, benefits directly brought by weight sharing are that connections between layers of the convolutional neural network are reduced, and an overfitting risk is reduced.

(6) Loss Function

In a process of training a deep neural network, because it is expected that an output of the deep neural network is as close as possible to a predicted value that is actually expected, a current predicted value of the network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed until the deep neural network can predict the target value that is actually expected or a value that is very close to the target value that is actually expected. Therefore, "how to obtain, through comparison, a difference between the predicted value and the target value" needs to be predefined. This is a loss function or an objective function. The loss function and the objective function are important equations used to measure the difference between the predicted value and the target value. The loss function is used as an example. A larger output value (e.g., Loss) of the loss function indicates a larger difference. Therefore, training of the deep neural network is a process of minimizing the Loss as much as possible.

(7) Back Propagation Algorithm

In a training process, a neural network may correct a value of a parameter of an initial neural network model by using an error back propagation (BP) algorithm, so that a reconstruction error loss of the neural network model becomes increasingly small. Specifically, an input signal is forward transferred until an error loss is generated in an output, and the parameter of the initial neural network model is updated through back propagation of information about the error loss, to converge the error loss. The back propagation algorithm is an error-loss-centered back propagation motion intended to obtain a parameter, such as a weight matrix, of an optimal neural network model.

In a conventional technology, compression performance of a data compression algorithm needs to be improved. For example, data occupies a large quantity of bits after compression processing. In view of this, embodiments of this application provide a data encoding and decoding method, to effectively improve data compression performance.

For example, data in the data encoding method and/or the data decoding method in embodiments of this application includes at least one of the following: image data, video data, motion vector (MV) data of the video data, audio data, point cloud data, or text data. The image data may be one image or at least two images. The video data is a continuous image sequence, and is essentially formed by a group of continuous images. For example, for the image data or the video data, the data encoding method and/or the data decoding method in embodiments of this application may be performed on at least one image in the image data or the video data, to implement encoding and decoding processing on the at least one image. For another example, for encoding and decoding of the video data, the data encoding method and the data decoding method in embodiments of this application may be used to process a frame of image A, to obtain a reconstructed frame corresponding to the image A. Then, the reconstructed frame is used to predict a next frame of image of the image A, to obtain a predicted image of the next frame of image. Next, a difference between the next frame of image and the predicted image is compressed. A reconstructed result obtained during decoding is a sum of the predicted image of the next frame of image and a reconstructed residual. For the video data, pixel data of each video frame is usually encoded as a block of a pixel (also referred to as a "pixel block", an "encoding unit", and a "macroblock" herein). A motion vector is used to describe an offset vector of a location of a macroblock in a video frame relative to a location of the macroblock in a reference frame. The motion vector data is at least one motion vector obtained based on the video data.

The point cloud data is a set of a group of vectors in a three-dimensional coordinate system. Scanned data is recorded in a form of points, each point includes three-dimensional coordinates, and some points may include color information or reflection intensity information. In addition to geometric locations, some point cloud data also includes color information. Color information is usually obtained by obtaining a color image by using a camera, and then color information of a pixel at a corresponding location is assigned to a corresponding point in a point cloud. Intensity information is echo intensity collected by a receiving apparatus for a laser scanner. The intensity information is related to a surface material, roughness, an incident angle direction of a target, emission energy of the instrument, and a laser wavelength. In addition, the text data is data including a text, and a data format of the text data may be a TXT file, a PDF file, a Word file, an Excel file, or the like. Further, application scenarios of the data encoding method and/or the data decoding method in embodiments of this application include a cloud storage service, cloud surveillance, live streaming, and the like.

FIG. 1A is a diagram of an architecture of a data coding system according to an embodiment of this application. For example, the data coding system in FIG. 1A includes a data encoder and a data decoder. The data encoder includes an encoding unit, an entropy encoding unit, and a saving unit. The data decoder includes a decoding unit, an entropy decoding unit, and a loading unit.

The encoding unit is configured to convert to-be-processed data into feature data with lower redundancy, and obtain a probability distribution corresponding to the feature data. The to-be-processed data includes at least one of the following: image data, video data, motion vector data of the video data, audio data, point cloud data, or text data.

The entropy encoding unit is configured to perform lossless encoding on the feature data based on a probability corresponding to the feature data, to further reduce a data transmission amount in a compression process.

The saving unit is configured to save a data file generated by the entropy encoding unit to a corresponding storage location.

The loading unit is configured to load the data file from the corresponding storage location, and input the data file to the entropy decoding unit.

The entropy decoding unit is configured to perform entropy decoding on the data file, to obtain processed data.

The decoding unit is configured to perform inverse conversion on the processed data output by the entropy decoding unit, and parse the processed data into reconstructed data.

For example, after a data collection device collects to-be-processed data, compression processing is performed on the to-be-processed data. A specific process is as follows: The to-be-processed data is processed by the encoding unit, to obtain a to-be-encoded feature and a corresponding probability distribution, the to-be-encoded feature and the probability distribution are input to the entropy encoding unit for processing, to obtain a bitstream file, and the saving unit saves the bitstream file. When the bitstream file is decompressed, a specific process is as follows: The loading unit loads the bitstream file from the storage location, and inputs the bitstream file to the entropy decoding unit, and the entropy decoding unit and the decoding unit may cooperate with each other to obtain reconstructed data corresponding to the bitstream file. Further, for example, the reconstructed data may be output, for example, output for display.

In the following embodiments of a coding system 10, an encoder 20 and a decoder 30 are described based on FIG. 1B and FIG. 1C.

Figure 1B:
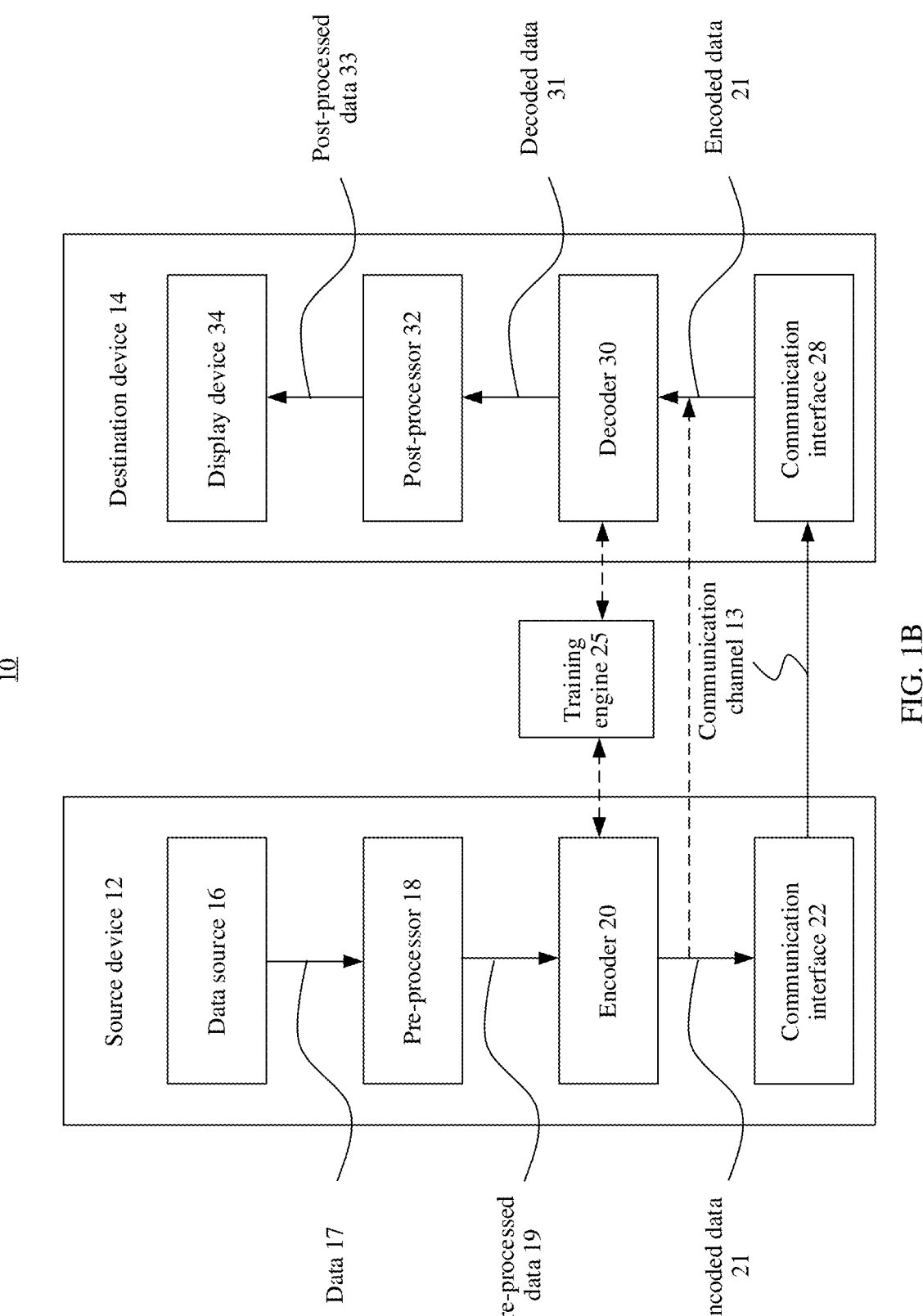
FIG. 1B is a block diagram of an example of a data coding system for implementing an example embodiment of this application.

FIG. 1B is a block diagram of an example of the coding system 10, for example, a data coding system 10 (or briefly referred to as a coding system 10) that may use technologies of this application. A data encoder 20 (or briefly referred to as an encoder 20) and a data decoder 30 (or briefly referred to as a decoder 30) in the coding system 10 represent devices and the like that may be configured to perform technologies based on various examples described in this application.

As shown in FIG. 1B, the coding system 10 includes a source device 12. The source device 12 is configured to provide encoded data 21 such as an encoded image, an encoded video, or encoded audio to a destination device 14 configured to decode the encoded data 21.

The source device 12 includes the encoder 20, and may additionally, that is, optionally, include a data source 16, a pre-processor (or a pre-processing unit) 18, and a communication interface (or a communication unit) 22.

The data source 16 may include or may be any type of data obtaining device configured to obtain data, and/or any type of data generation device. In this embodiment, the data includes at least one of the following: image data, video data, motion vector data of the video data, audio data, point cloud data, or text data.

For example, the data is image data. In this case, the data source 16 may include or may be any type of image capture device configured to capture a real-world image and the like, and/or any type of image generation device, for example, a computer graphics processing unit configured to generate a computer animation image or any type of device configured to obtain and/or provide a real-world image, a computer-generated image (for example, screen content or a virtual reality (VR) image), and/or any combination thereof (for example, an augmented reality (AR) image). The data source may be any type of memory or storage storing any of the foregoing images.

For example, the data is video data. In this case, the data source 16 may include or may be any type of video recording device configured to capture a real-world image and the like to generate a video, and/or any type of video generation device, for example, a computer graphics processor configured to generate a computer animation or any type of device configured to obtain and/or provide a real-world video or a computer-generated video (for example, a video obtained through screen recording). The data source may be any type of memory or storage storing any of the foregoing videos.

For example, the data is audio data. In this case, the data source 16 may include or may be any type of audio capture device configured to capture a real-world sound and the like to generate audio, and/or any type of audio generation device, for example, an audio processor configured to generate virtual audio (for example, a virtual human voice) or any type of device configured to obtain and/or provide real-world audio or computer-generated audio (for example, audio obtained through screen recording). The data source may be any type of memory or storage storing any of the foregoing audio.

For example, the data is point cloud data. In this case, the data source 16 may include or may be any type of device configured to obtain the point cloud data, for example, a three-dimensional laser scanner or a photographing scanner.

To distinguish processing performed by the pre-processor (or the pre-processing unit) 18, data 17 may also be referred to as original data 17.

The pre-processor 18 is configured to receive the (original) data 17 and pre-process the data 17, to obtain pre-processed data 19. For example, the data is image data. In this case, pre-processing performed by the pre-processor 18 may include trimming, color format conversion (for example, conversion from RGB into YCbCr), color correction, or denoising. It may be understood that the pre-processing unit 18 may be an optional component.

The encoder 20 is configured to receive the pre-processed data 19 and provide the encoded data 21 (further descriptions are given below based on FIG. 4A, FIG. 4C, FIG. 4D, FIG. 4F, FIG. 4G, FIG. 4I, and the like).

The communication interface 22 of the source device 12 may be configured to: receive the encoded data 21, and send the encoded data 21 (or any further processed version thereof) through a communication channel 13 to another device such as the destination device 14 or any other device, for storage or direct reconstruction.

The destination device 14 includes the decoder 30, and may additionally, that is, optionally, include a communication interface (or a communication unit) 28, a post-processor (or a post-processing unit) 32, and a display device 34.

The communication interface 28 of the destination device 14 is configured to: receive the encoded data 21 (or any further processed version thereof) directly from the source device 12 or from any other source device such as a storage device, for example, an encoded data storage device, and provide the encoded data 21 to the decoder 30.

The communication interface 22 and the communication interface 28 may be configured to send or receive the encoded data 21 through a direct communication link between the source device 12 and the destination device 14, for example, a direct wired or wireless connection, or through any type of network, for example, a wired or wireless network or any combination thereof, or any type of private and public network, or any type of combination thereof.

For example, the communication interface 22 may be configured to encapsulate the encoded data 21 into a suitable format such as a packet, and/or process the encoded data 21 through any type of transmission encoding or processing for transmission over a communication link or a communication network.

The communication interface 28 corresponds to the communication interface 22, and may be configured to, for example, receive the transmitted data, and process the transmitted data through any type of corresponding transmission decoding or processing and/or decapsulation to obtain the encoded data 21.

Both the communication interface 22 and the communication interface 28 may be configured as unidirectional communication interfaces as indicated by an arrow that corresponds to the communication channel 13 in FIG. 1B and that points from the source device 12 to the destination device 14, or bi-directional communication interfaces, and may be configured to send and receive messages and the like, to establish a connection, confirm and exchange any other information such as encoded data, and the like.

The decoder 30 is configured to receive the encoded data 21 and provide decoded data (or reconstructed data) 31 (further descriptions are given below based on FIG. 4B, FIG. 4E, FIG. 4H, and the like).

The post-processor 32 is configured to post-process the decoded data 31, to obtain post-processed data 33. For example, the data is image data, and post-processing performed by the post-processing unit 32 may include, for example, color format conversion (for example, conversion from YCbCr into RGB), color correction, trimming, re-sampling, or any other processing such as generating the post-processed data 33 for display by the display device 34 and the like.

The display device 34 is configured to receive the post-processed data 33 for displaying the data to a user, a viewer, or the like. The display device 34 may be or include any type of display configured to represent the reconstructed data, for example, an integrated or external display screen or display. For example, the display screen may include a liquid crystal display (LCD), an organic light-emitting diode (OLED) display, a plasma display, a projector, a micro-LED display, a liquid crystal on silicon (LCoS), a digital light processor (DLP), or any other type of display screen.

The coding system 10 further includes a training engine 25. The training engine 25 is configured to train a neural network in the encoder 20 or the decoder 30, so that the encoder 20 can obtain the encoded data 21 when the data 17 or the pre-processed data 19 is input, or the decoder 30 can obtain the decoded data 31 when the encoded data 21 is input. Optionally, input data further includes hyperprior information.

Training data may be stored in a database (not shown in FIG. 1B), and the training engine 25 obtains a neural network through training based on the training data. The neural network is a neural network in the encoder 20 or the decoder 30. It should be noted that a source of the training data is not limited in embodiments of this application. For example, the training data may be obtained from a cloud or another place to perform neural network training.

The neural network obtained by the training engine 25 through training may be applied to the coding system 10 or a coding system 40, for example, applied to the source device 12 (for example, the encoder 20) or the destination device 14 (for example, the decoder 30) shown in FIG. 1B. For example, the training engine 25 may obtain, on the cloud, the neural network through training, and then the coding system 10 downloads the neural network from the cloud and uses the neural network.

Although FIG. 1B shows that the source device 12 and the destination device 14 are separate devices, the device embodiment may also include both the source device 12 and the destination device 14, or include functions of both the source device 12 and the destination device 14, that is, include both the source device 12 or a corresponding function and the destination device 14 or a corresponding function. In such embodiments, the source device 12 or the corresponding function and the destination device 14 or the corresponding function may be implemented by using same hardware and/or software or by using separate hardware and/or software or any combination thereof.

It is clear for skilled persons that, based on the descriptions, existence and (accurate) division of different units or functions of the source device 12 and/or the destination device 14 shown in FIG. 1B may vary depending on an actual device and application.

Figure 1C:
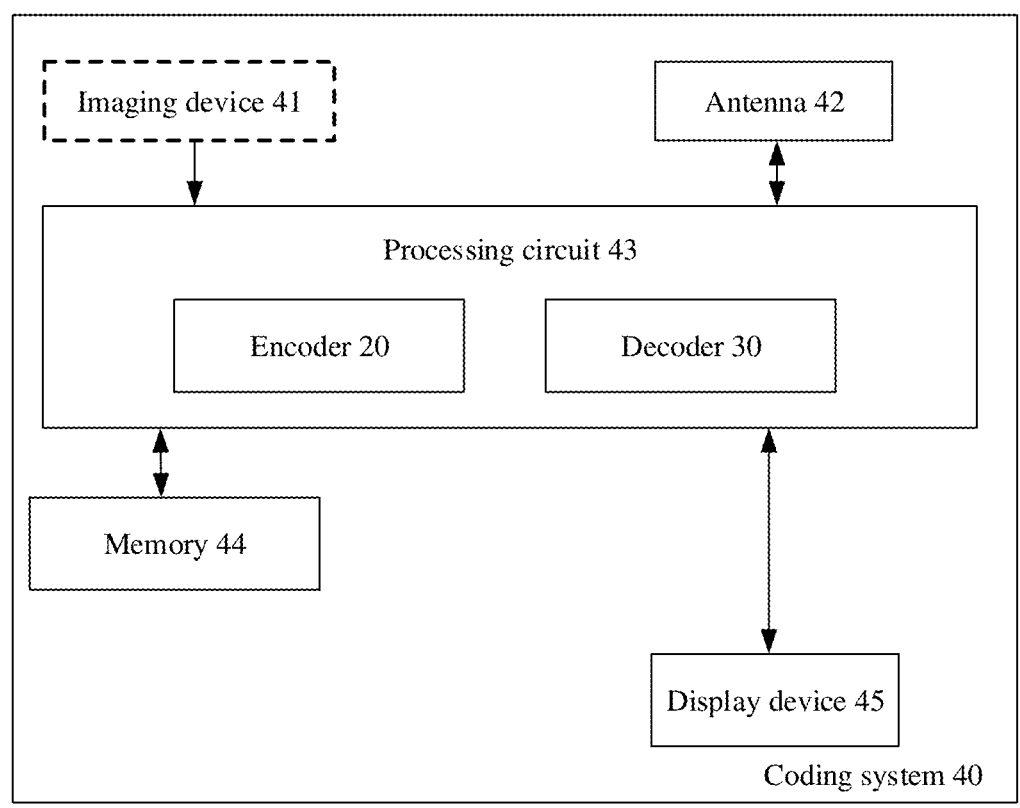
FIG. 1C is a block diagram of another example of a data coding system for implementing an example embodiment of this application.
Figure 3:
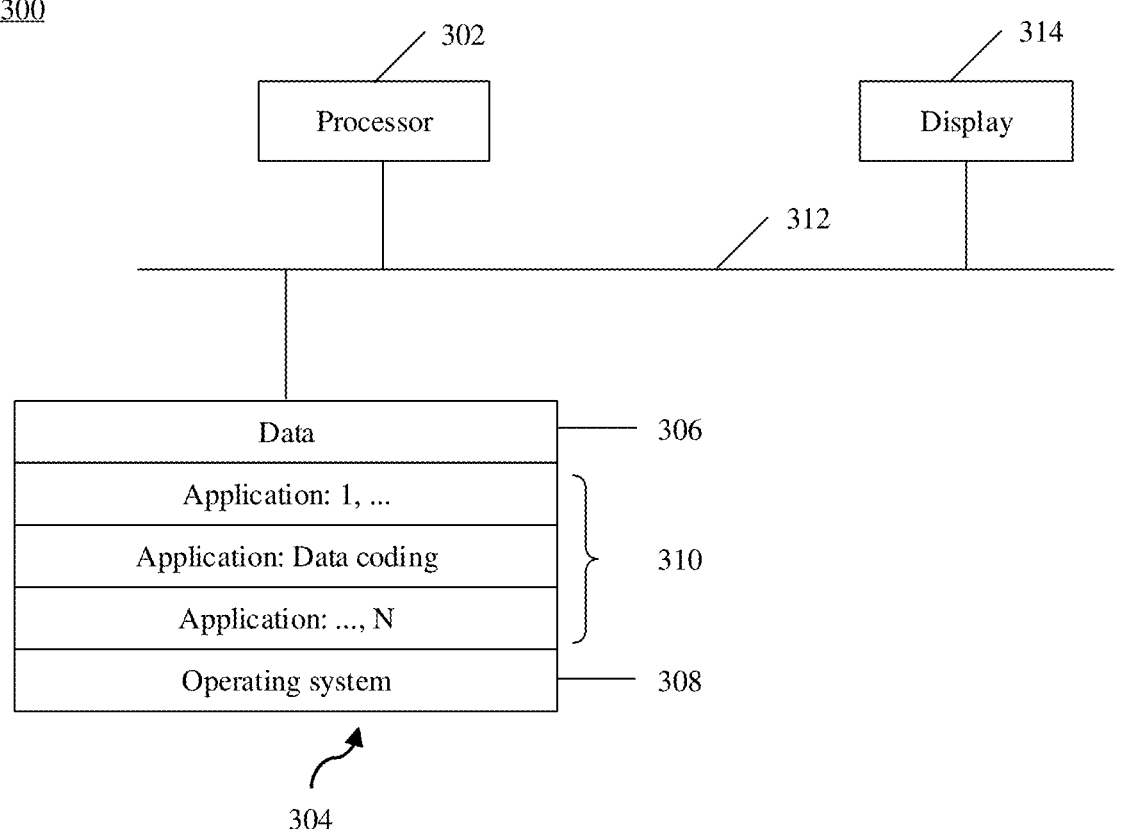
FIG. 3 is a block diagram of an example of a data coding apparatus for implementing an example embodiment of this application.

The encoder 20 or the decoder 30 or both may be implemented by using a processing circuit shown in FIG. 1C, for example, one or more microprocessors, a digital signal processor (DSP), an application-specific integrated circuit (ASIC), a field-programmable gate array (FPGA), discrete logic, hardware, a dedicated video coding processor, or any combination thereof. The encoder 20 may be implemented by using a processing circuit 43, to embody various modules as discussed with reference to an encoder 20 in FIG. 1C and/or any other encoder system or subsystem described in this specification. The decoder 30 may be implemented by using the processing circuit 43, to embody various modules as discussed with reference to a decoder 30 in FIG. 1C and/or any other decoder system or subsystem described in this specification. The processing circuit 43 may be configured to perform various operations described below. As shown in FIG. 3, if some technologies are implemented in software, a device may store software instructions in a suitable non-transitory computer-readable storage medium, and may execute the instructions in hardware by using one or more processors, to perform the technologies in this application. Either of the encoder 20 and the decoder 30 may be integrated as part of a codec (Encoder/Decoder) into a single device, as shown in FIG. 1C.

The source device 12 and the destination device 14 may include any of a wide range of devices, including any type of handheld or stationary device, for example, a notebook or laptop computer, a mobile phone, a smartphone, a tablet or a tablet computer, a camera, a desktop computer, a server, a set-top box, a television, a display device, a digital media player, a video gaming console, a video streaming device (such as a content service server or a content delivery server), a broadcast receiver device, a broadcast transmitter device, or the like, and may use no or any type of operating system. In some cases, the source device 12 and the destination device 14 may be equipped with components for wireless communication. Therefore, the source device 12 and the destination device 14 may be wireless communication devices.

In some cases, the coding system 10 shown in FIG. 1B is merely an example, the technologies provided in this application are applicable to coding settings, and these settings do not necessarily include any data communication between an encoding device and a decoding device. In another example, data is retrieved from a local storage, is sent through a network, and the like. An encoding device may encode data and store the data to a storage, and/or a decoding device may retrieve data from a storage and decode the data. In some examples, encoding and decoding are performed by devices that do not communicate with each other, but simply encode data to a storage and/or retrieve data from a storage and decode the data.

FIG. 1C is an illustrative diagram of an example of a coding system 40 including an encoder 20 and/or a decoder 30 according to an example embodiment. The coding system 40 may include the encoder 20 and the decoder 30 (and/or an encoder/decoder implemented by using the processing circuit 43), an antenna 42, one or more memories 44, and/or a display device 45. For example, when data is image data, the coding system may further include an imaging device 41.

As shown in FIG. 1C, the imaging device 41, the antenna 42, the processing circuit 43, the encoder 20, the decoder 30, the memory 44, and/or the display device 45 can communicate with each other. In different examples, the coding system 40 may include only the encoder 20 or only the decoder 30. Certainly, the coding system 40 is not limited to the composition shown in FIG. 1C, and may include more or fewer components than those shown in FIG. 1C.

In some examples, the antenna 42 may be configured to transmit or receive an encoded bitstream of data. Further, in some examples, the display device 45 may be configured to present reconstructed data. The processing circuit 43 may include application-specific integrated circuit (ASIC) logic, a graphics processing unit, a general-purpose processor, and the like. In addition, the memory 44 may be any type of memory, for example, a volatile memory (for example, a static random access memory (SRAM) or a dynamic random access memory (DRAM)), a non-volatile memory (for example, a flash memory), or the like. In a non-limitative example, the memory 44 may be implemented by a cache memory. In another example, the processing circuit 43 may include a memory (for example, a cache) for implementing an image buffer.

In some examples, the coding system 40 may further include a decoder 30 that is coupled to the antenna 42 and that is configured to decode an encoded bitstream. The display device 45 is configured to present reconstructed data.

It should be understood that, in this embodiment of this application, for the example described with reference to the encoder 20, the decoder 30 may be configured to perform a reverse process.

Figure 2:
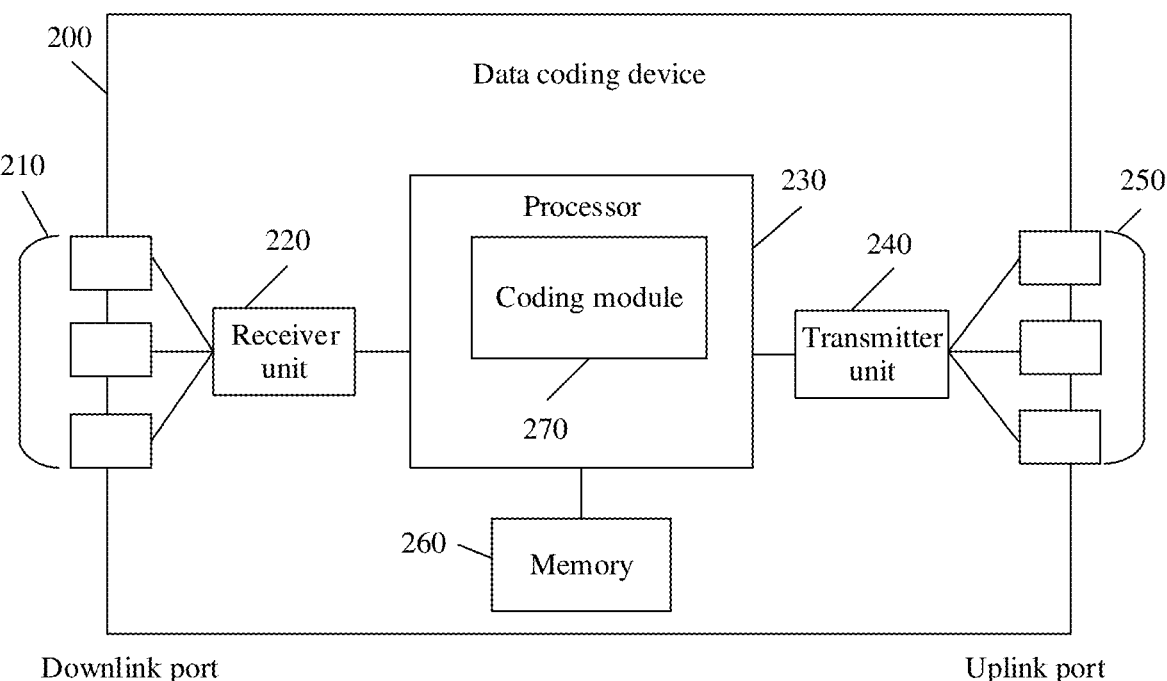
FIG. 2 is a block diagram of an example of a data coding device for implementing an example embodiment of this application.

FIG. 2 is a diagram of a data coding device 200 according to an embodiment of this application. The data coding device 200 is suitable for implementing the disclosed embodiments described in this specification. In an embodiment, the data coding device 200 may be a decoder, for example, the decoder 30 in FIG. 1C, or may be an encoder, for example, the encoder 20 in FIG. 1C.

The data coding device 200 includes: an ingress port 210 (or an input port 210) and a receiver unit (Rx) 220 that are configured to receive data; a processor, a logic unit, or a central processing unit (CPU) 230 configured to process data, for example, the processor 230 herein may be a neural network processor 230; a transmitter unit (Tx) 240 and an egress port 250 (or an output port 250) that are configured to transmit data; and a memory 260 configured to store data. For example, the data coding device 200 may further include an optical-to-electrical (OE) component and an electrical-to-optical (EO) component that are coupled to the ingress port 210, the receiver unit 220, the transmitter unit 240, and the egress port 250, for egress or ingress of an optical signal or an electrical signal.

The processor 230 is implemented by using hardware and software. The processor 230 may be implemented as one or more processor chips, a core (for example, a multi-core processor), an FPGA, an ASIC, and a DSP. The processor 230 communicates with the ingress port 210, the receiver unit 220, the transmitter unit 240, the egress port 250, and the memory 260. The processor 230 includes a coding module 270 (for example, a coding module 270 based on a neural network (NN)). The coding module 270 implements the disclosed embodiments described above. For example, the coding module 270 performs, processes, prepares, or provides various coding operations. Therefore, the coding module 270 provides substantial improvement to functions of the data coding device 200 and affects switching of the data coding device 200 between different states. Alternatively, the coding module 270 is implemented by using instructions stored in the memory 260 and executed by the processor 230.

The memory 260 includes one or more magnetic disks, a tape drive, and a solid-state drive, may be used as an over-flow data storage device, and is configured to store a program when such a program is selected for execution and store instructions and data that are read during execution of the program. The memory 260 may be volatile and/or non-volatile, and may be a read-only memory (ROM), a random access memory (RAM), a ternary content-addressable memory (TCAM), and/or a static random access memory (SRAM).

FIG. 3 is a simplified block diagram of a data coding apparatus 300 according to an example embodiment. The apparatus 300 may be used as either or both of the source device 12 and the destination device 14 in FIG. 1B.

A processor 302 in the apparatus 300 may be a central processing unit. Alternatively, the processor 302 may be any other type of device or a plurality of devices capable of manipulating or processing information that exist nowadays or will be developed in the future. Although the disclosed implementations can be implemented by using a single processor, for example, the processor 302 shown in FIG. 3, a higher speed and higher efficiency are achieved by using more than one processor.

In an implementation, a memory 304 in the apparatus 300 may be a read-only memory (ROM) device or a random access memory (RAM) device. Any other suitable type of storage device may be used as the memory 304. The memory 304 may include code and data 306 that are accessed by the processor 302 through a bus 312. The memory 304 may further include an operating system 308 and an application 310. The application 310 includes at least one program that allows the processor 302 to perform the method described in this specification. For example, the application 310 may include applications 1 to N, and further include a data coding application that performs the method described in this specification, that is, data encoding and/or data decoding.

The apparatus 300 may further include one or more output devices, for example, a display 314. In an example, the display 314 may be a touch sensitive display that combines a display with a touch sensitive element that may be configured to sense a touch input. The display 314 may be coupled to the processor 302 through the bus 312.

Although the bus 312 in the apparatus 300 is depicted as a single bus in this specification, the bus 312 may include a plurality of buses. In addition, a secondary storage may be directly coupled to another component of the apparatus 300 or may be accessed through a network, and may include a single integrated unit such as a storage card or a plurality of units such as a plurality of storage cards. Therefore, the apparatus 300 may have a wide variety of configurations.

Figure 4A:
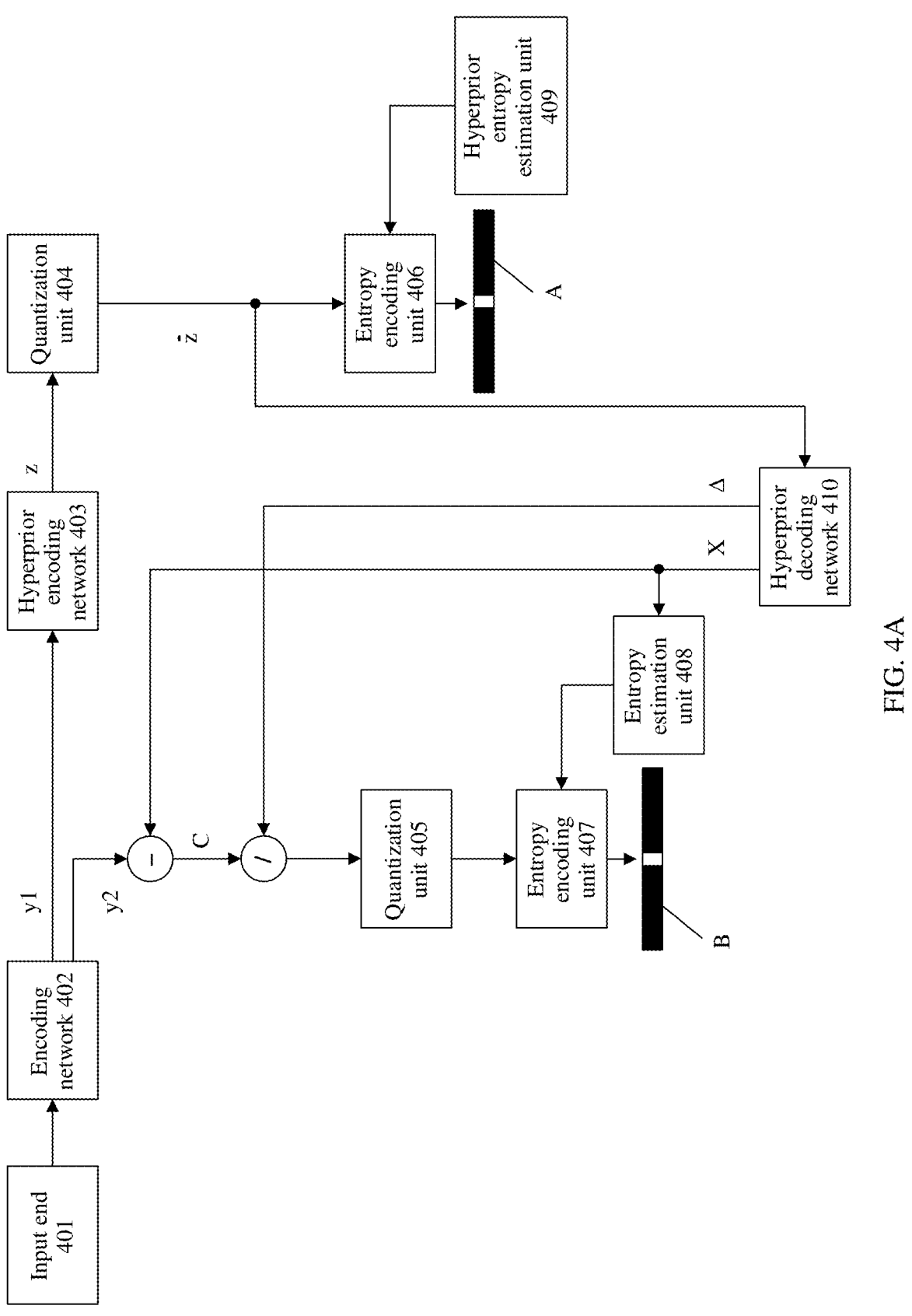
FIG. 4A is a diagram of a structure of a data encoder according to an example embodiment of this application.

FIG. 4A is a diagram of a structure of a data encoder according to an embodiment of this application. In an example of FIG. 4A, a data encoder 20 includes an input end (or an input interface) 401, an encoding network (Encoder) 402, a hyperprior encoding network (HyperEncoder) 403, a quantization unit 404, a quantization unit 405, an entropy encoding unit 406, an entropy encoding unit 407, an entropy estimation unit (Entropy) 408, a hyperprior entropy estimation unit (HyperEntropy) 409, and a hyperprior decoding network (HyperDecoder) 410. The quantization unit 404 and the quantization unit 405 may be a same quantization unit, or may be two independent quantization units. Similarly, the entropy encoding unit 406 and the entropy encoding unit 407 may be a same entropy encoding unit, or may be two independent entropy encoding units. The entropy estimation unit 408 is also referred to as an entropy parameter model unit, and the hyperprior entropy estimation unit 409 is an entropy parameter model unit that uses a preset distribution.

The data encoder 20 may receive to-be-encoded data through the input end 401 and the like. The to-be-encoded data includes at least one of the following: image data, video data, motion vector data of the video data, audio data, point cloud data, or text data.

The encoding network 402 is configured to extract features from the to-be-encoded data, to obtain a first feature map y1 and a second feature map y2. The first feature map y1 is different from the second feature map y2. A method for obtaining the first feature map y1 and the second feature map y2 is not particularly limited.

For example, the data is image data. For example, compared with an original image, the first feature map and the second feature map that are output by the encoding network

402 may have a change in size, and redundant information is removed, so that it is easier to perform entropy encoding.

The hyperprior encoding network 403 is configured to further extract brief information from the first feature map y1, to obtain a side information feature map z. For example, a size of the side information feature map z is smaller than that of the first feature map y1.

The quantization unit 404 is configured to perform quantization processing on the side information feature map z, to obtain integer feature data, that is, a first quantized feature map z̄.

The hyperprior decoding network 410 is configured to generate a scaling coefficient Δ and a first probability distribution parameter X based on the first quantized feature map z̄. The first probability distribution parameter X represents a probability distribution of a second quantized feature map, and X includes but is not limited to a mean u and/or a variance σ. The first probability distribution parameter X is a matrix whose scale is the same as a scale of the second quantized feature map. Each of elements in the matrix represents a probability distribution parameter of one of elements in the second quantized feature map. A probability distribution parameter of each of the elements includes but is not limited to a mean and/or a variance. That is, one second quantized feature map corresponds to one mean matrix and/or one variance matrix.

In addition, for example, the hyperprior decoding network 410 may be configured only to generate the scaling coefficient Δ based on the first quantized feature map z̄, and the first probability distribution parameter X is a probability distribution parameter that is preset according to an actual situation. This is not particularly limited.

A residual of the second feature map y2, that is, a residual feature map C, may be obtained based on the second feature map and the first probability distribution parameter X. Specifically, the residual feature map C may be obtained by subtracting X from y2. For example, the residual feature map C is obtained by subtracting the mean μ from the second feature map y2.

Scaling processing is performed on the residual feature map C based on the scaling coefficient Δ, to obtain a scaled residual feature map C. Specifically, the scaled residual feature map C may be obtained by dividing the residual feature map C by the scaling coefficient Δ.

The quantization unit 405 is configured to perform quantization processing on the scaled residual feature map C, to obtain integer feature data, that is, the second quantized feature map.

The hyperprior entropy estimation unit 409 is configured to estimate a probability distribution of the first quantized feature map z̄ based on a preset distribution. The preset distribution may be a Gaussian distribution, a binomial distribution, a uniform distribution, a Laplace distribution, or the like. This is not particularly limited, and may be set according to an actual situation.

The entropy encoding unit 406 is configured to encode the first quantized feature map z̄ into a first bitstream A based on the probability distribution of the first quantized feature map z̄ estimated by the hyperprior entropy estimation unit 409.

The entropy estimation unit 408 is configured to obtain a probability distribution of the second quantized feature map based on the first probability distribution parameter X.

The entropy encoding unit 407 is configured to perform entropy encoding on the second quantized feature map based on a probability estimated by the entropy estimation unit 408, to obtain a second bitstream B. The first bitstream A and the second bitstream B are used as a total bitstream of the to-be-encoded data. The data encoder may output the total bitstream of the data through an output end (or an output interface) (not shown in FIG. 4A).

Figure 4B:
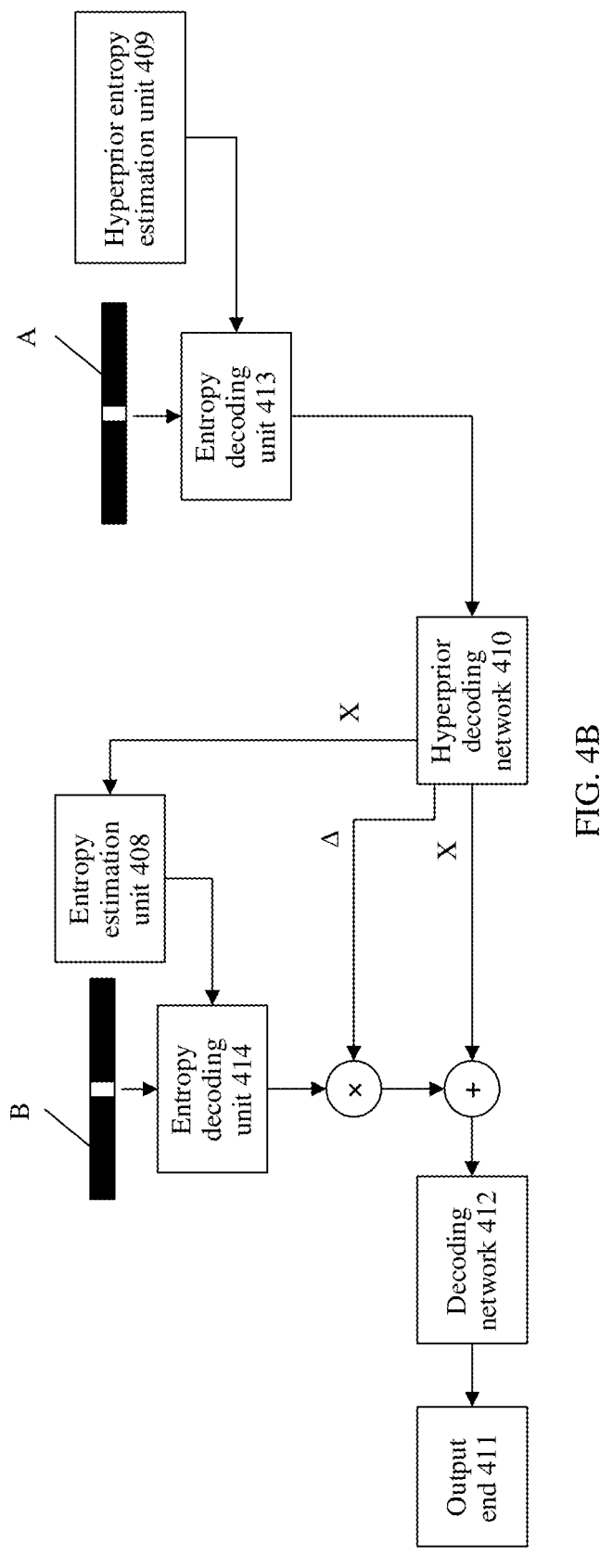
FIG. 4B is a diagram of a structure of a data decoder according to an example embodiment of this application.

FIG. 4B is a diagram of a structure of a data decoder according to an embodiment of this application. The data decoder shown in FIG. 4B is configured to decode the total bitstream of the data obtained through processing by the data encoder shown in FIG. 4A. A data decoder 30 includes an entropy estimation unit 408, an entropy decoding unit 414, a hyperprior entropy estimation unit 409, an entropy decoding unit 413, a hyperprior decoding network 410, a decoding network 412, and an output end (or an output interface) 411.

The data decoder 30 may obtain the to-be-decoded total bitstream, that is, the first bitstream A and the second bitstream B, through an input end (or an input interface) (not shown in FIG. 4B).

The hyperprior entropy estimation unit 409 is configured to estimate a probability distribution of a first quantized feature map z̄ based on a preset distribution.

The entropy decoding unit 413 is configured to perform entropy decoding on the first bitstream A based on a probability estimated by the hyperprior entropy estimation unit 409, to obtain a third feature map. The entropy decoding unit 413 performs entropy decoding by using a distribution consistent with the distribution used by the entropy encoding unit 406.

The hyperprior decoding network 410 is configured to generate a scaling coefficient Δ and a first probability distribution parameter X based on the third feature map. The first probability distribution parameter X represents a probability distribution of a fourth feature map, and X includes but is not limited to a mean μ and/or a variance σ. The first probability distribution parameter X is a matrix whose scale is the same as a scale of the fourth feature map. Each of elements in the matrix represents a probability distribution parameter of one of elements in the fourth feature map. A probability distribution parameter of each of the elements includes but is not limited to a mean and/or a variance. That is, one fourth feature map corresponds to one mean matrix and/or one variance matrix.

In addition, for example, the hyperprior decoding network 410 may be configured only to generate the scaling coefficient Δ based on the third feature map, and the first probability distribution parameter X is a probability distribution parameter that is preset according to an actual situation. This is not particularly limited.

The entropy estimation unit 408 is configured to obtain a probability distribution of the fourth feature map based on the first probability distribution parameter X.

The entropy decoding unit 414 is configured to perform entropy decoding on the second bitstream B based on a probability estimated by the entropy estimation unit 408, to obtain the fourth feature map.

A fifth feature map may be obtained based on the scaling coefficient Δ and the fourth feature map. That is, the fifth feature map may be obtained by multiplying the fourth feature map by the scaling coefficient Δ.

A sixth feature map may be obtained based on the fifth feature map and the first probability distribution parameter X. That is, the sixth feature map may be obtained by adding the first probability distribution parameter X to the fifth feature map. For example, corresponding to FIG. 4A, in this case, the sixth feature map may be obtained by adding the mean μ to the fifth feature map.

The decoding network 412 is configured to inversely map the sixth feature map into reconstructed data.

The output end 411 is configured to output the reconstructed data.

Figure 4C:
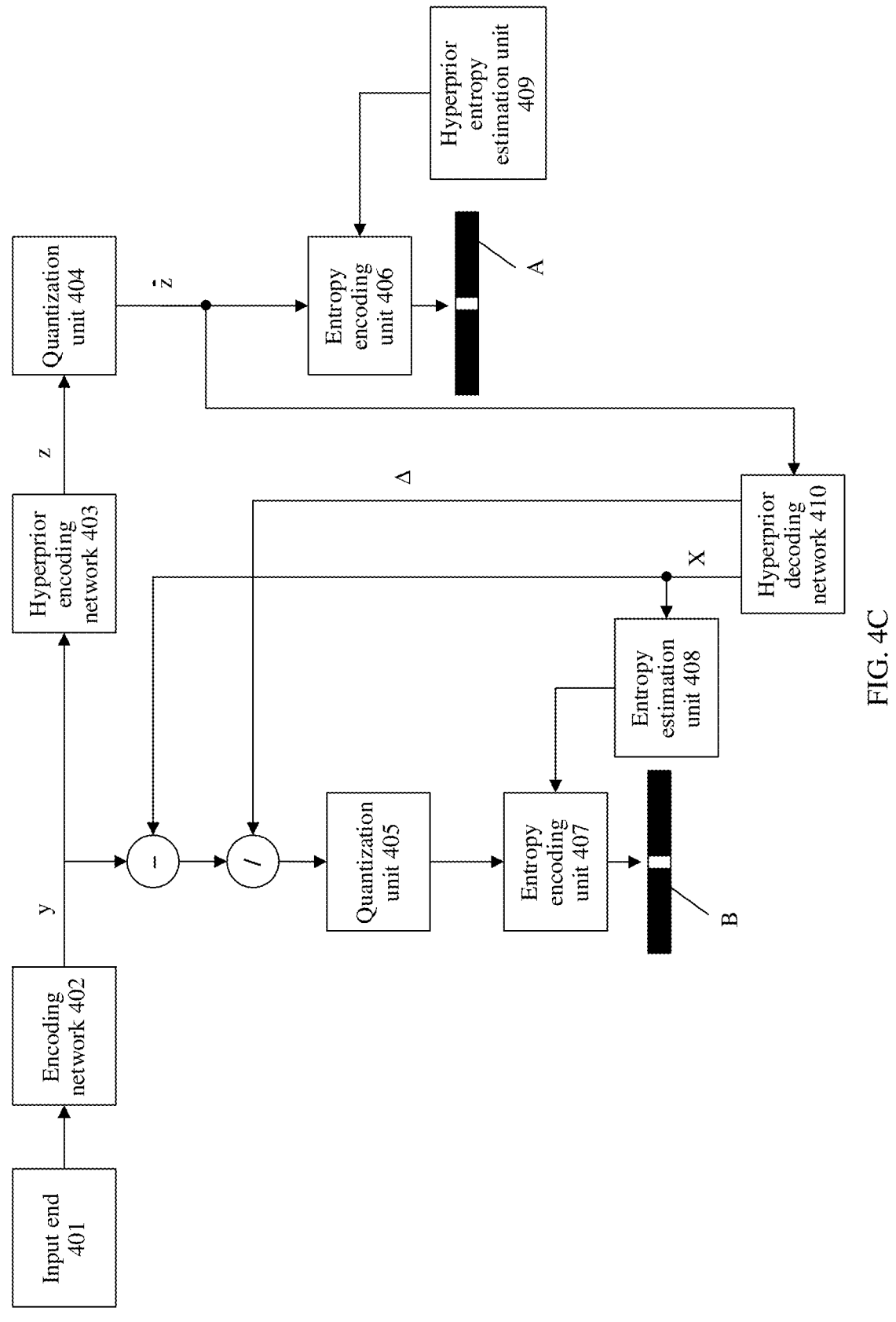
FIG. 4C is a diagram of a structure of another data encoder according to an example embodiment of this application.

FIG. 4C is a diagram of a structure of another data encoder according to an embodiment of this application. The data encoder shown in FIG. 4C has same composition as the data encoder shown in FIG. 4A. A difference lies in that an encoding network 402 is configured to perform feature extraction on to-be-processed data, to obtain a feature map y (that is, in this case, a first feature map y1 is the same as a second feature map y2). In this case, a data decoder configured to decode a total bitstream of the data obtained through processing in FIG. 4C has a same structure as that in FIG. 4B.

Figure 4D:
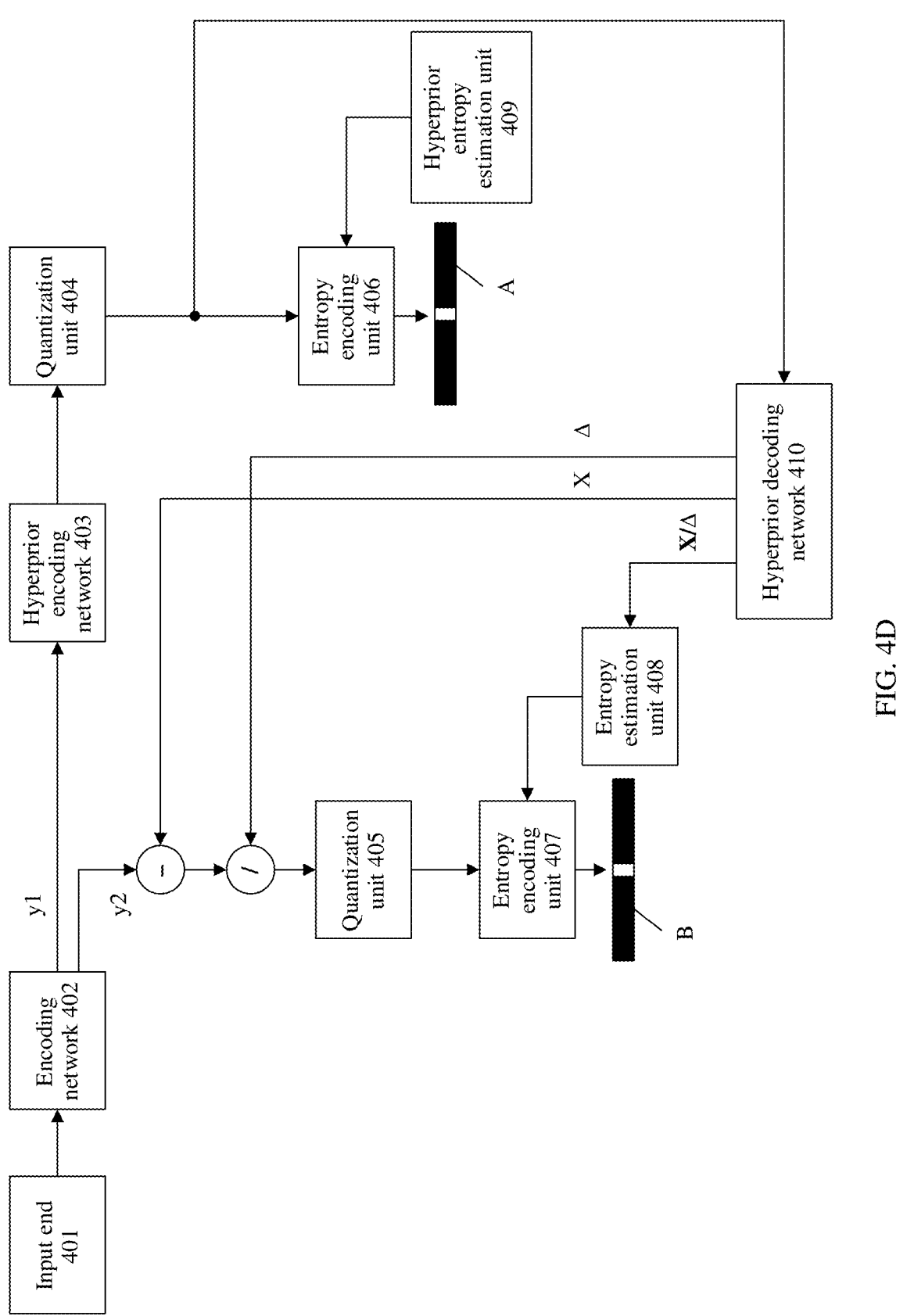
FIG. 4D is a diagram of a structure of another data encoder according to an example embodiment of this application.

FIG. 4D is a diagram of a structure of another data encoder according to an embodiment of this application. A difference between the data encoder shown in FIG. 4D and the data encoder shown in FIG. 4A lies in that there is a scaling and quantization operation on a residual feature map and a scaling operation on a probability distribution parameter in FIG. 4D. Specifically, after a hyperprior decoding network 410 obtains a first probability distribution parameter X and a scaling coefficient Δ, scaling processing is performed on the first probability distribution parameter X based on the scaling coefficient Δ. That is, the first probability distribution parameter X is divided by the scaling coefficient Δ, to obtain a second probability distribution parameter (X/Δ). An entropy encoding unit 407 is configured to cooperate with an entropy estimation unit 408 to perform entropy encoding on a second quantized feature map based on the second probability distribution parameter (X/Δ), to obtain a second bitstream B.

Figure 4E:
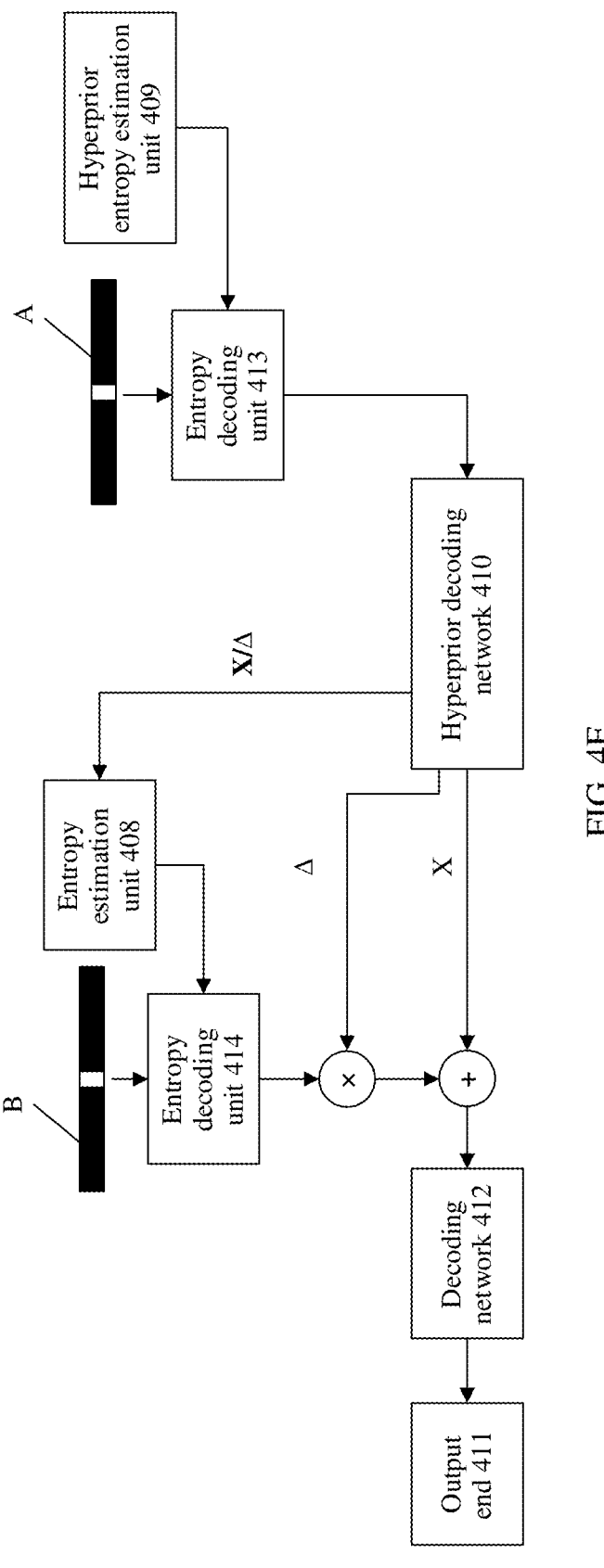
FIG. 4E is a diagram of a structure of another data decoder according to an example embodiment of this application.

FIG. 4E is a diagram of a structure of another data decoder according to an embodiment of this application. The data decoder shown in FIG. 4E is configured to decode a total bitstream of data obtained through processing by the data encoder shown in FIG. 4D. The data decoder shown in FIG. 4E has same composition as the data decoder shown in FIG. 4B. A difference lies in that after a hyperprior decoding network 410 obtains a first probability distribution parameter X and a scaling coefficient Δ, scaling processing is performed on the first probability distribution parameter X based on the scaling coefficient Δ. That is, the first probability distribution parameter X is divided by the scaling coefficient Δ, to obtain a second probability distribution parameter (X/Δ). An entropy decoding unit 414 is configured to cooperate with an entropy estimation unit 408 to perform entropy decoding on a second bitstream B based on the second probability distribution parameter (X/Δ), to obtain a fourth feature map.

Figure 4F:
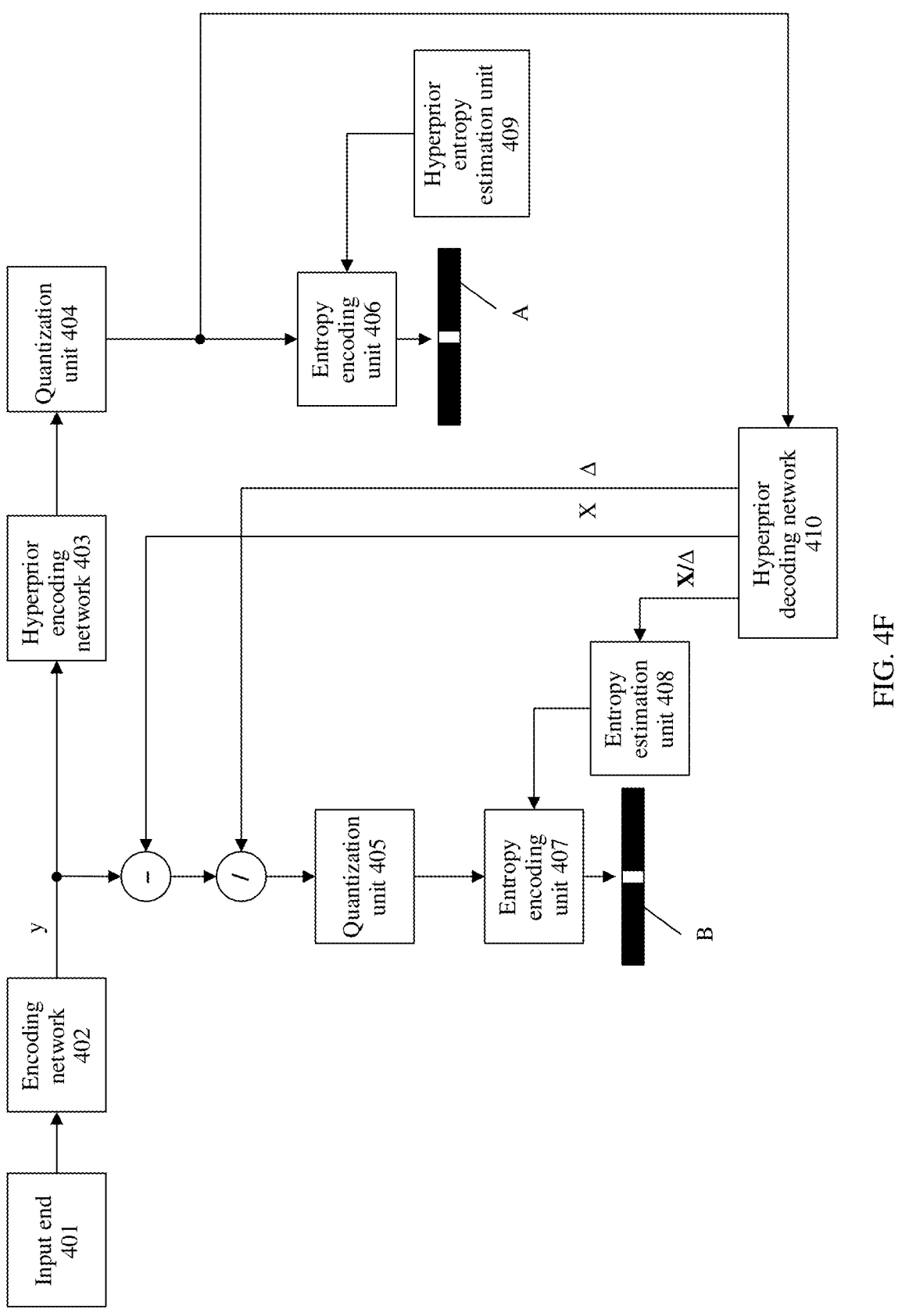
FIG. 4F is a diagram of a structure of another data encoder according to an example embodiment of this application.

FIG. 4F is a diagram of a structure of another data encoder according to an embodiment of this application. A difference between the data encoder shown in FIG. 4F and the data encoder shown in FIG. 4D lies in that, in this case, a first feature map y1 is the same as a second feature map y2. That is, an encoding network 402 performs feature extraction on to-be-processed data, to obtain a feature map y. In this case, a data decoder configured to decode a total bitstream of the data obtained through processing in FIG. 4F has a same structure as that in FIG. 4E.

Figure 4G:
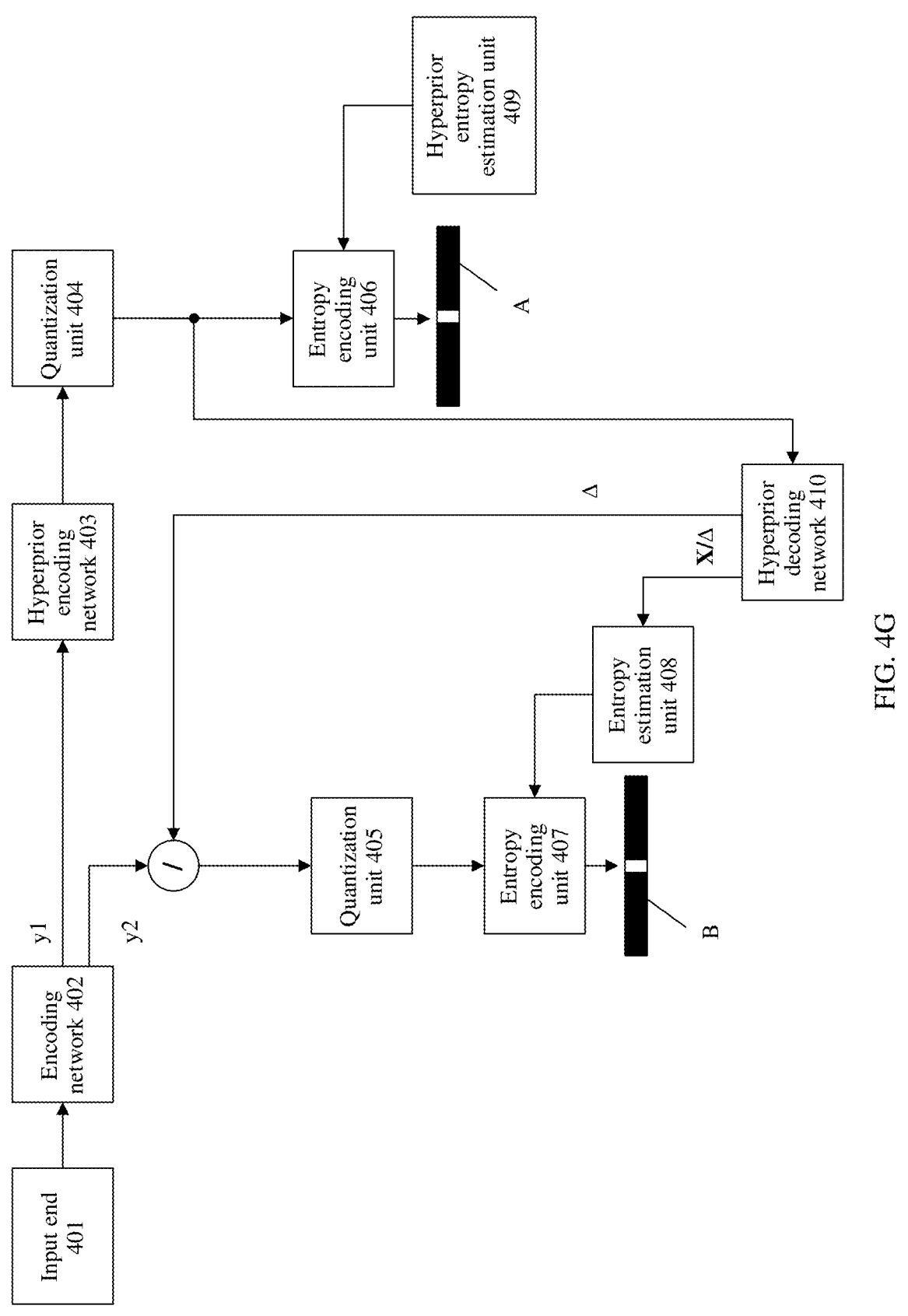
FIG. 4G is a diagram of a structure of another data encoder according to an example embodiment of this application.

FIG. 4G is a diagram of a structure of another data encoder according to an embodiment of this application. A difference from the data encoder shown in FIG. 4D lies in that the data encoder shown in FIG. 4G does not generate a residual feature map, and does not perform an operation of scaling a residual feature map. In FIG. 4G, after an encoding network 402 obtains a second feature map y2 of to-be-processed data, scaling processing is performed on the second feature map y2 based on a scaling coefficient Δ. That is, the second feature map y2 is divided by the scaling coefficient Δ, to obtain a scaled feature map. A quantization unit 405 then performs quantization processing on the scaled feature map, to obtain a second quantized feature map. FIG. 4H is a diagram of a structure of another data decoder according to an embodiment of this application. The data decoder shown in FIG. 4H is configured to decode a total bitstream of data obtained through processing by the data encoder shown in FIG. 4G. The data decoder 30 includes an entropy estimation unit 408, an entropy decoding unit 414, a hyperprior entropy estimation unit 409, an entropy decoding unit 413, a hyperprior decoding network 410, a decoding network 412, and an output end (or an output interface) 411.

Figure 4H:
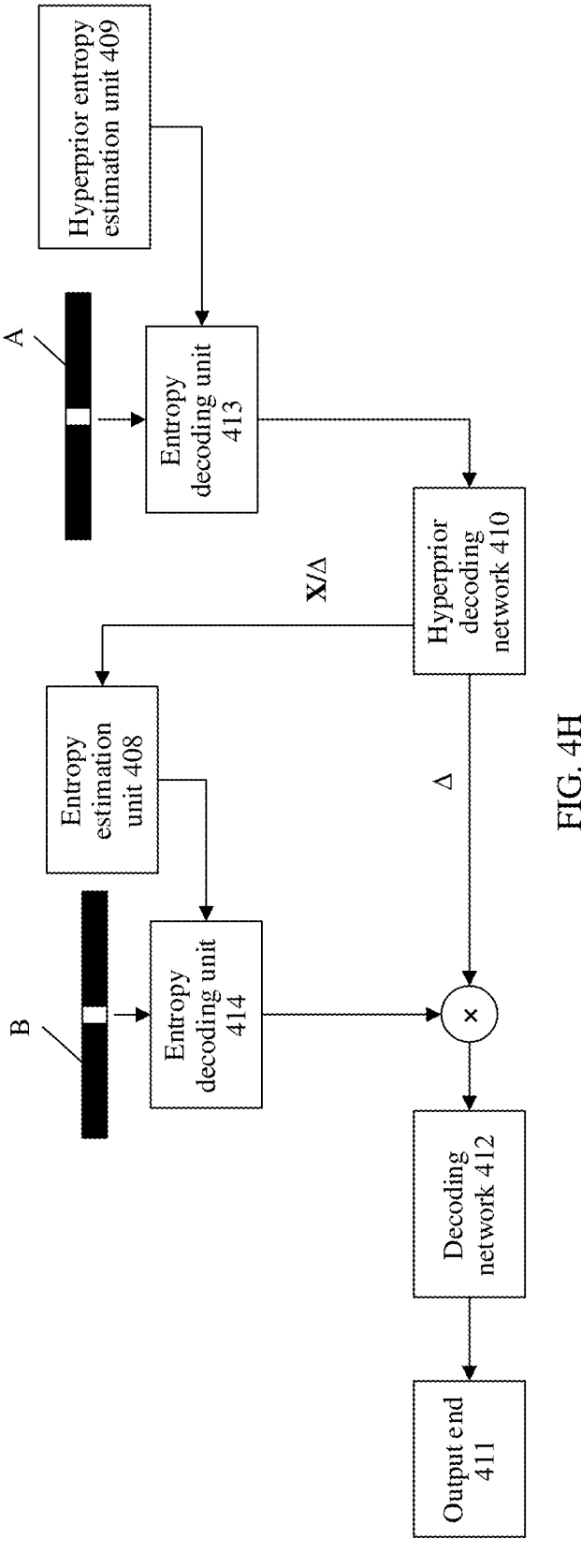
FIG. 4H is a diagram of a structure of another data decoder according to an example embodiment of this application.

The data decoder 30 may obtain the to-be-decoded total bitstream, that is, a first bitstream A and a second bitstream B, through an input end (or an input interface) (not shown in FIG. 4H).

The entropy decoding unit 413 is configured to cooperate with the hyperprior entropy estimation unit 409 to perform entropy decoding on the first bitstream A, to obtain a third feature map.

The hyperprior decoding network 410 is configured to generate a scaling coefficient Δ and a first probability distribution parameter X based on the third feature map. The first probability distribution parameter X represents a probability distribution of a fourth feature map, and X includes but is not limited to a mean μ and/or a variance σ.

In addition, for example, the hyperprior decoding network 410 may be configured only to generate the scaling coefficient Δ based on the third feature map, and the first probability distribution parameter X is a probability distribution parameter that is preset according to an actual situation. This is not particularly limited.

Scaling processing is performed on the first probability distribution parameter X based on the scaling coefficient Δ. That is, the first probability distribution parameter X is divided by the scaling coefficient Δ, to obtain a second probability distribution parameter (X/Δ).

The entropy decoding unit 414 is configured to cooperate with the entropy estimation unit 408 to perform entropy decoding on the second bitstream B based on the second probability distribution parameter (X/Δ), to obtain the fourth feature map.

A fifth feature map may be obtained based on the scaling coefficient Δ and the fourth feature map, that is, obtained by multiplying the fourth feature map by the scaling coefficient Δ.

The decoding network 412 is configured to inversely map the fifth feature map into reconstructed data.

The output end 411 is configured to output the reconstructed data.

Figure 4I:
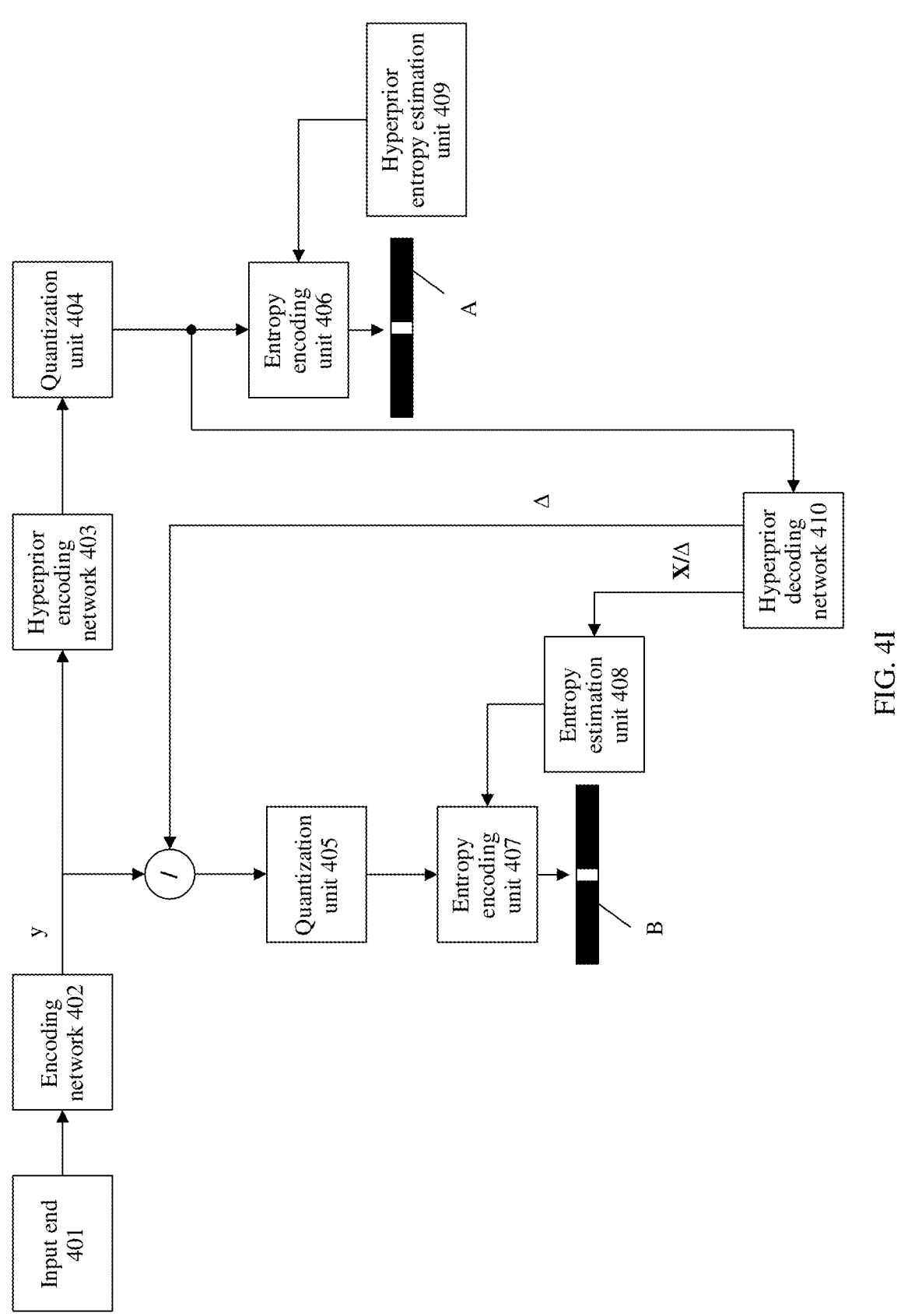
FIG. 4I is a diagram of a structure of another data encoder according to an example embodiment of this application.

FIG. 4I is a diagram of a structure of another data encoder according to an embodiment of this application. The data encoder shown in FIG. 4I is similar to that shown in FIG. 4G. A difference lies in that, in FIG. 4I, a first feature map y1 is the same as a second feature map y2. That is, an encoding network 402 performs feature extraction on to-be-processed data, to obtain a feature map y. A data decoder configured to decode a total bitstream of the data obtained through processing by the data encoder shown in FIG. 4I has a same structure as that in FIG. 4H.

It should be noted herein that at least one of the encoding network, the hyperprior encoding network, the quantization unit, the entropy encoding unit, the entropy decoding unit, the hyperprior entropy estimation unit, the entropy estimation unit, the hyperprior decoding network, and the decoding network described above may be implemented by using a neural network, for example, a convolutional neural network.

Figure 5A:
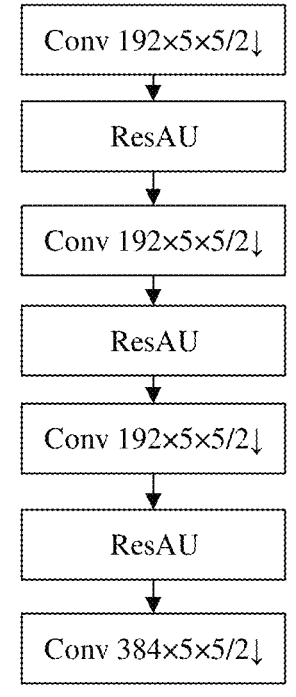
FIG. 5A is a diagram of a structure of an encoding network according to an example embodiment of this application.

For example, for a specific structure of the encoding network 402 in the data encoder shown in FIG. 4C, FIG. 4F, or FIG. 4I, reference may be made to a structure shown in FIG. 5A. The encoding network 402 includes a first convolutional (Conv) layer, a first non-linear unit (ResAU) layer, a second convolutional layer, a second non-linear unit (ResAU) layer, a third convolutional layer, a third non-linear unit (ResAU) layer, and a fourth convolutional layer. For example, specific parameters of the first convolutional layer, the second convolutional layer, the third convolutional layer, and/or the fourth convolutional layer are $192 \times 5 \times 5/2\downarrow$, where a quantity of channels is 192, a size of a convolution kernel is 5×5, and a stride is 2. A feature map y of to-be-processed data may be obtained by using the encoding network shown in FIG. 5A.

Figure 5B:
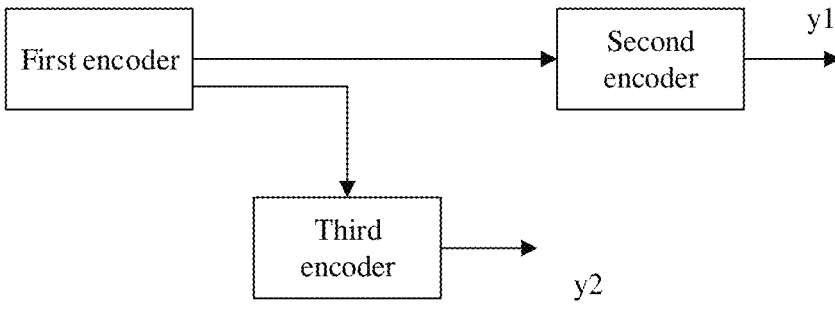
FIG. 5B is a diagram of a structure of another encoding network according to an example embodiment of this application.

For example, for a specific structure of the encoding network 402 in the data encoder shown in FIG. 4A, FIG. 4D, or FIG. 4G, reference may be made to a structure shown in FIG. 5B. The encoding network 402 includes a first encoder, a second encoder, and a third encoder. The first encoder is configured to perform feature extraction for the first time on to-be-processed data. The second encoder and the third encoder are configured to perform feature extraction again on a feature map obtained through extraction by the first encoder, to obtain a first feature map y1 and a second feature map y2 respectively.

For another example, for a specific structure of the encoding network 402 in the data encoder shown in FIG. 4A, FIG. 4D, or FIG. 4G, feature extraction may be performed by using the encoding network shown in FIG. 5A, to obtain a feature map y, and then channel separation is performed on the feature map y, to obtain a first feature map y1 and a second feature map y2. A specific method for the channel separation is not limited. For example, the feature map y obtained in FIG. 5A has 384 channels, a (a is less than 384) channels of the feature map y may be used as the first feature map y1, and remaining (384-a) channels of the feature map y may be used as the second feature map y2. For example, first 192 channels of the feature map y may be used as the first feature map y1, and last 192 channels of the feature map y may be used as the second feature map y2.

Figures 5C, 5D:
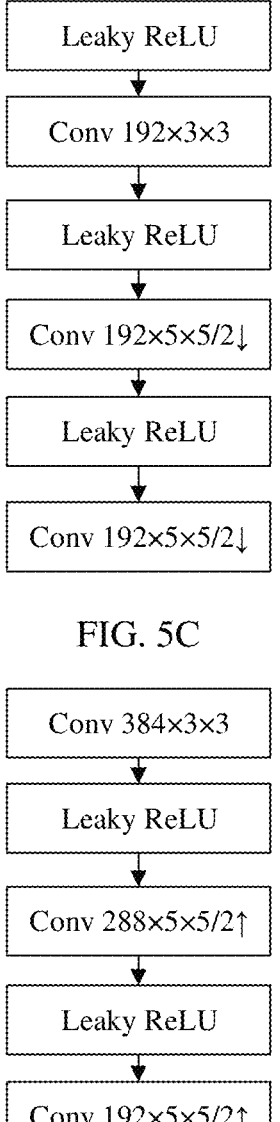
FIG. 5C is a diagram of a structure of a hyperprior encoding network according to an example embodiment of this application.
FIG. 5D is a diagram of a structure of a hyperprior decoding network according to an example embodiment of this application.

For example, for a specific structure of the hyperprior encoding network in the data encoder shown in FIG. 4A, FIG. 4C, FIG. 4D, FIG. 4F, FIG. 4G, or FIG. 4I, reference may be made to a structure shown in FIG. 5C. The hyperprior encoding network includes a first leaky ReLU layer, a first convolutional layer, a second leaky ReLU layer, a second convolutional layer, a third leaky ReLU layer, and a third convolutional layer. For example, specific parameters of the first convolutional layer are 192×3×3, where a quantity of channels is 192, and a size of a convolution kernel is 3×3. Specific parameters of the second convolutional layer and/or the third convolutional layer are $192 \times 5 \times 5/2\downarrow$, where a quantity of channels is 192, a size of a convolution kernel is 5×5, and a stride is 2.

For example, for a specific structure of the hyperprior decoding network in any one of FIG. 4A to FIG. 4I, reference may be made to a structure shown in FIG. 5D. The hyperprior decoding network includes a first convolutional layer, a first leaky ReLU layer, a second convolutional layer, a second leaky ReLU layer, and a third convolutional layer. For example, specific parameters of the first convolutional layer are 384×3×3, where a quantity of channels is 384, and a size of a convolution kernel is 3×3. Specific parameters of the second convolutional layer are $288 \times 5 \times 5/2\uparrow$, where a quantity of channels is 288, a size of a convolution kernel is 5×5, and a stride is 2. Specific parameters of the third convolutional layer are $192 \times 5 \times 5/2\uparrow$, where a quantity of channels is 192, a size of a convolution kernel is 5×5, and a stride is 2.

For example, for a specific structure of the decoding network in the data decoder shown in FIG. 4B, FIG. 4E, or FIG. 4H, reference may be made to a structure shown in FIG. 5E. The decoding network includes a first convolutional layer, a first ResAU layer, a second convolutional layer, a second ResAU layer, a third convolutional layer, a third ResAU layer, and a fourth convolutional layer. For example, specific parameters of the first convolutional layer, the second convolutional layer, and/or the third convolutional layer are $192 \times 5 \times 5/2\uparrow$, where a quantity of channels is 192, a size of a convolution kernel is 5×5, and a stride is 2. Specific parameters of the fourth convolutional layer are $384 \times 5 \times 5/2\uparrow$, where a quantity of channels is 384, a size of a convolution kernel is 5×5, and a stride is 2.

For example, for a specific structure of the ResAU layer in the structure shown in FIG. 5A and/or FIG. 5E, reference may be made to FIG. 5F. The ResAU layer includes a leaky ReLU layer, a convolutional layer, and a Tan h layer.

Figure 6A:
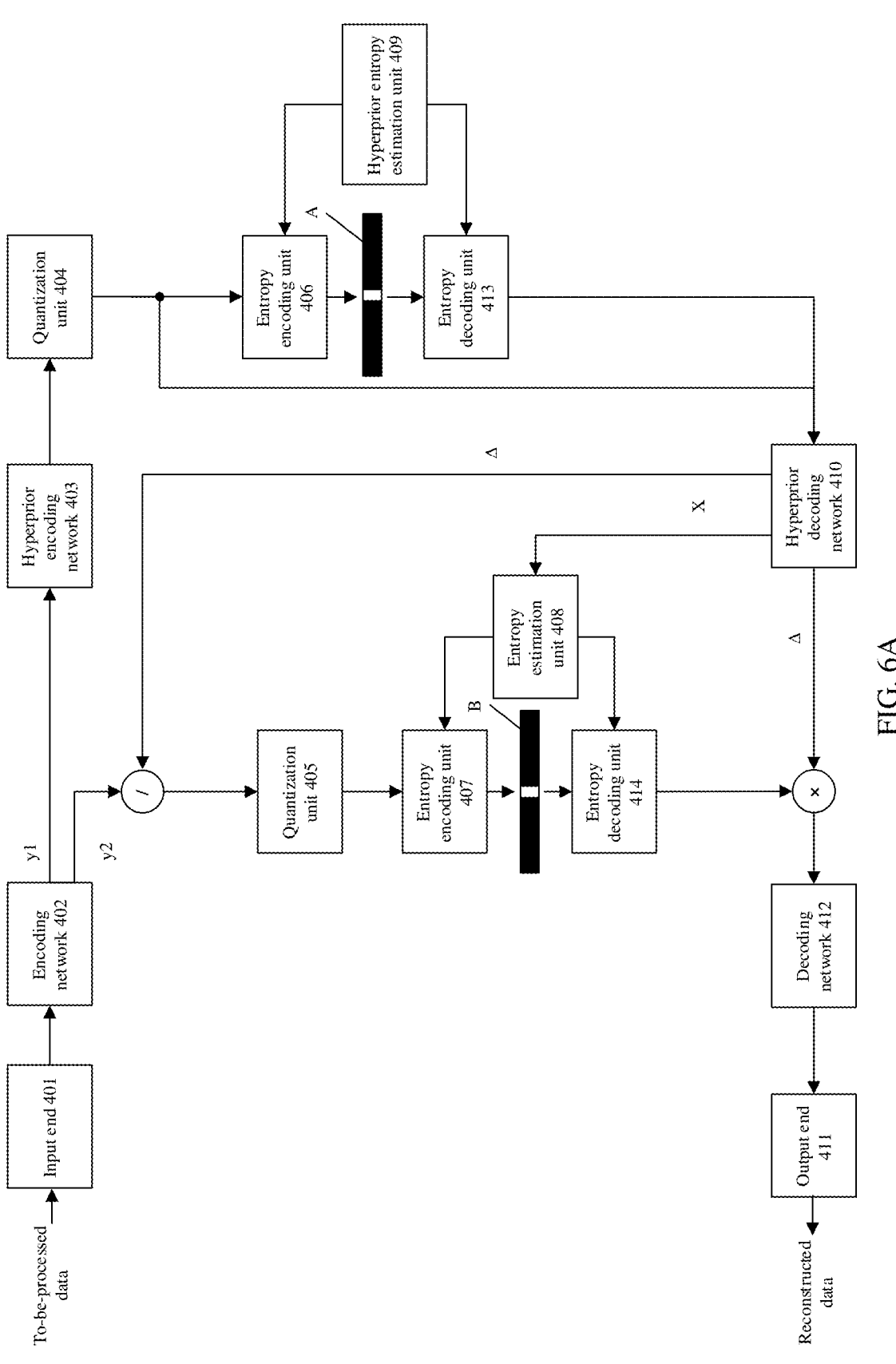
FIG. 6A is a diagram of a structure of another data coding system according to an example embodiment of this application.

The following uses a data coding system including FIG. 4A and FIG. 4B (referred to as a first data coding system below) as an example, and compares the data coding system with a data coding system shown in FIG. 6A (referred to as a second data coding system below) for description. There is a scaling operation on a residual feature map in the first data coding system, while there is a scaling operation on a feature map in the second data coding system.

For example, data is image data. A Kodak test set is used as to-be-processed data. The test set includes 24 PNG images with a resolution of 768×512 or 512×768. Each test image is processed by using the first data coding system and the second data coding system separately, and BPP (Bits per pixel), a peak signal-to-noise ratio (PSNR), and a BD rate (Bjøntegaard-Delta bit Rate) are obtained. For details, refer to Table 1. The BPP and the PSNR in Table 1 are average values of the 24 images. The BPP represents an average quantity of bits used by a pixel, and smaller BPP indicates a smaller compression bit rate. The peak signal-to-noise ratio is an objective criterion for evaluating image quality, and a higher peak signal-to-noise ratio indicates better image quality. The BD rate indicates a bit rate reduction (a compression rate increase) in the two comparison methods under same image quality.

It can be learned from Table 1 that a result of the first data coding system is better than that of the second data coding system. A BD rate of the first data coding system is better, and performance is improved by 3.87%. It can be learned that scaling and quantization on the residual feature map can improve compression performance.

TABLE 1

| Performance comparison between a first data coding system and a second data coding system | | | |
|---|---|---|---|
| | BPP | PSNR | BD rate |
| Second data coding system | 0.9273 | 36.6919 | −0.038768 |
| | 0.5114 | 33.4378 | |
| | 0.3192 | 31.2768 | |
| | 0.1437 | 28.363 | |
| First data coding system | 0.9262 | 36.7109 | |
| | 0.5287 | 33.797 | |

25
26

TABLE 1-continued

| | | |
|---|---|---|
| Performance comparison between a first data coding system and a second data coding system | | |
| BPP | PSNR | BD rate |
| 0.3448 | 31.7746 | |
| 0.1487 | 28.7146 | |

Figure 6B:
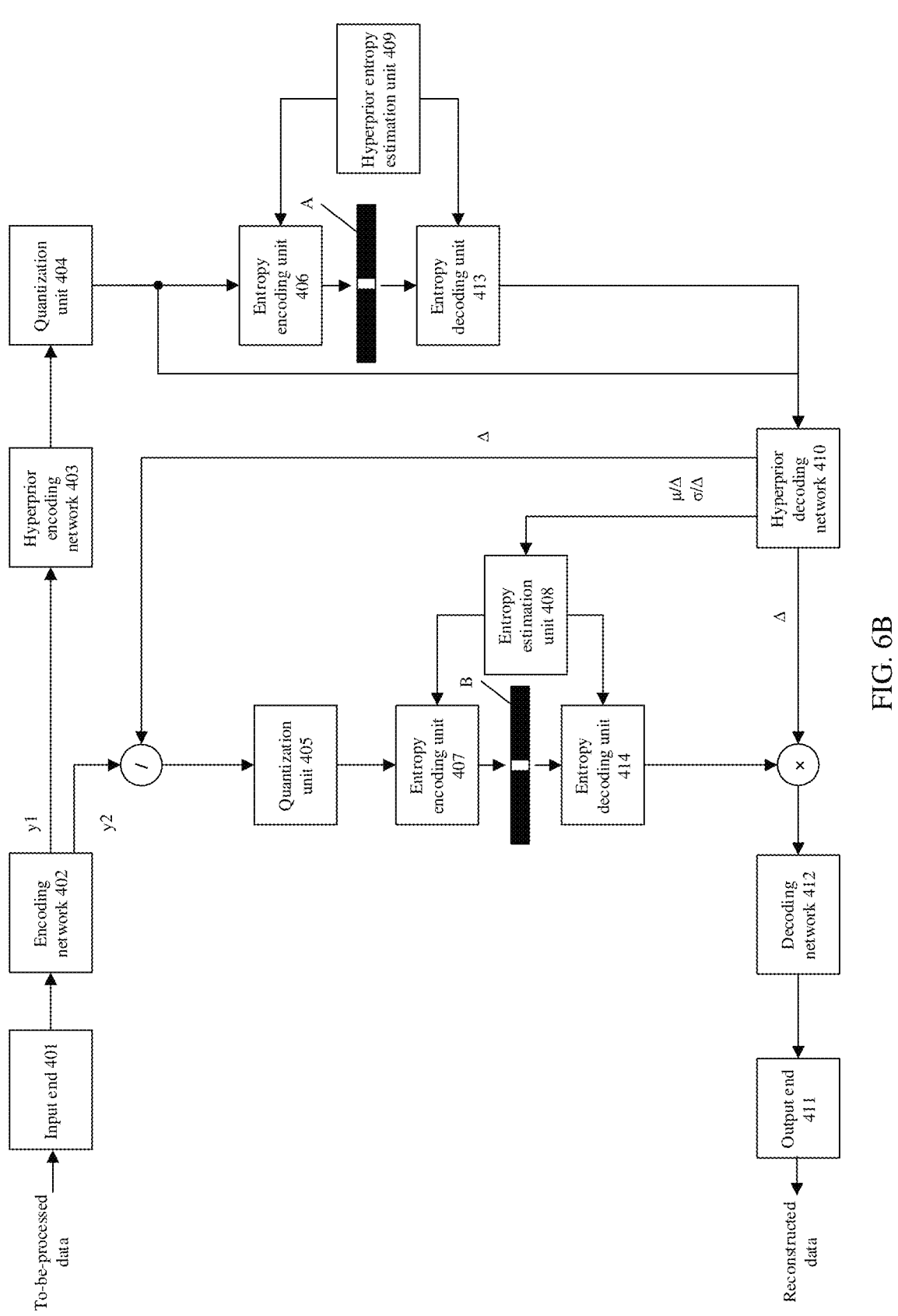
FIG. 6B is a diagram of a structure of another data coding system according to an example embodiment of this application.

The following uses a data coding system shown in FIG. 6B (referred to as a third data coding system below) as an example, and compares the data coding system with the second data coding system shown in FIG. 6A for description. There is a scaling operation on a feature map in the second data coding system, while there is a scaling operation on a feature map and a scaling operation on a probability distribution parameter in the third data coding system. For example, both a mean μ and a variance σ are scaled in the third data coding system.

For example, data is image data. A Kodak test set is used as to-be-processed data. The test set includes 24 PNG images with a resolution of 768×512 or 512×768. Each test image is processed by using the second data coding system and the third data coding system separately, and BPP, a PSNR, and a BD rate are obtained. For details, refer to Table 2. Similarly, the BPP and the PSNR in Table 2 are average values of the 24 images.

It can be learned from Table 2 that a result of the third data coding system is better than that of the second data coding system. A BD rate of the third data coding system is better, and performance is improved by 2.71%. It can be learned that scaling on the probability distribution parameter can improve compression performance.

TABLE 2

| | | | |
|---|---|---|---|
| Performance comparison between a second data coding system and a third data coding system | | | |
| | BPP | PSNR | BD rate |
| Second data coding system | 0.9273 | 36.6919 | −0.027174 |
| | 0.5114 | 33.4378 | |
| | 0.3192 | 31.2768 | |
| | 0.1437 | 28.363 | |
| Third data coding system | 0.9179 | 36.8004 | |
| | 0.5419 | 33.9413 | |
| | 0.364 | 31.9356 | |
| | 0.1427 | 28.3709 | |

The following compares the first data coding system with a data coding system including FIG. 4D and FIG. 4E (referred to as a fourth data coding system below) for description. There is a scaling operation on a residual feature map in the first data coding system, while there is a scaling operation on a residual feature map and a scaling operation on a probability distribution parameter in the fourth data coding system. For example, a variance σ is scaled in the fourth data coding system.

For example, data is image data. A Kodak test set is used as to-be-processed data. The test set includes 24 PNG images with a resolution of 768×512 or 512×768. Each test image is processed by using the first data coding system and the fourth data coding system separately, and BPP, a PSNR, and a BD rate are obtained. For details, refer to Table 3. Similarly, the BPP and the PSNR in Table 3 are average values of the 24 images.

It can be learned from Table 3 that a result of the fourth data coding system is better than that of the first data coding system. A BD rate of the fourth data coding system is better, and performance is improved by 0.65%. It can be learned that scaling on the probability distribution parameter can improve compression performance.

TABLE 3

| | | | |
|---|---|---|---|
| Performance comparison between a first data coding system and a fourth data coding system | | | |
| | BPP | PSNR | BD rate |
| First data coding system | 0.9262 | 36.7109 | −0.006516 |
| | 0.5287 | 33.797 | |
| | 0.3448 | 31.7746 | |
| | 0.1487 | 28.7146 | |
| Fourth data coding system | 0.9134 | 36.782 | |
| | 0.5293 | 33.7932 | |
| | 0.3397 | 31.7355 | |
| | 0.148 | 28.732 | |

FIG. 7 is a schematic flowchart of a data encoding method according to an embodiment of this application. A data encoding method 700 is performed by a data encoder 20. The method shown in FIG. 7 is described as a series of steps or operations. It should be understood that the steps or operations of the method may be performed in various sequences and/or simultaneously, and are not limited to a performing sequence shown in FIG. 7.

As shown in FIG. 7, the data encoding method 700 includes the following steps.

701: Perform side information feature extraction on a first feature map of current data, to obtain a side information feature map.

The data includes at least one of the following: image data, video data, motion vector data of the video data, audio data, point cloud data, or text data. Side information means that existing information Y is used to assist in encoding information X, so that an encoded length of the information X can be shorter. In other words, redundancy in the information X is reduced. The information Y is the side information. In this embodiment of this application, the side information is information that is extracted from the first feature map and that is used to assist in encoding and decoding the first feature map.

702: Perform quantization processing on the side information feature map, to obtain a first quantized feature map.

703: Perform entropy encoding on the first quantized feature map, to obtain a first bitstream of the current data.

A bitstream is a bitstream generated after encoding processing. In this case, the first bitstream is a bitstream obtained after the entropy encoding is performed on the first quantized feature map.

704: Perform scaling processing on a residual feature map based on a scaling coefficient, to obtain a scaled feature map, and perform quantization processing on the scaled feature map, to obtain a second quantized feature map. The residual feature map is obtained based on a second feature map of the current data and a first probability distribution parameter, and the scaling coefficient is obtained based on the first quantized feature map. In this case, the scaling processing is scaling-down processing.

In this embodiment, the first feature map and the second feature map are different feature maps obtained by performing feature extraction on the complete current data.

705: Perform entropy encoding on the second quantized feature map based on the first probability distribution parameter, to obtain a second bitstream of the current data.

The first probability distribution parameter is a matrix whose scale is the same as a scale of the second quantized feature map. Each of elements in the matrix represents a probability distribution parameter of one of elements in the second quantized feature map. A probability distribution parameter of each of the elements includes but is not limited to a mean and/or a variance. That is, one second quantized feature map corresponds to one mean matrix and/or one variance matrix. The second bitstream is a bitstream obtained after the entropy encoding is performed on the second quantized feature map.

In this solution, during encoding, after the scaling processing is performed on the residual feature map of the current data to obtain the scaled feature map, the quantization processing is performed on the scaled feature map, so that a quantization loss of the scaled feature map is smaller. That is, an information loss of the second bitstream is smaller. This helps improve data quality of reconstructed data obtained through decoding based on the second bitstream. In addition, compared with an encoding network structure in a conventional technology, in this embodiment of this application, an encoding network structure including the scaling on the residual feature map is used, so that after training of an entire encoding network is completed, network parameters of the entire encoding network can be optimized, including a network for generating the first bitstream and a network for generating the second bitstream. Therefore, with the use of the encoding network structure in this embodiment of this application, a data amount of a total bitstream of the current data can be reduced, and encoding efficiency can be improved. In general, the encoding method in this embodiment can further improve data compression performance.

For example, the first quantized feature map is input to a hyperprior decoding network, and the first probability distribution parameter and the scaling coefficient may be obtained through prediction. The first probability distribution parameter represents a probability distribution of the second quantized feature map.

For another example, the first quantized feature map is input to a hyperprior decoding network, and the scaling coefficient may be obtained through prediction. The first probability distribution parameter is a preset probability distribution parameter.

In some possible embodiments, the first probability distribution parameter includes a mean and/or a variance.

In some possible embodiments, the first feature map is the same as the second feature map.

FIG. 8 is a schematic flowchart of another data encoding method according to an embodiment of this application. A data encoding method 800 is performed by a data encoder 20. The method shown in FIG. 8 is described as a series of steps or operations. It should be understood that the steps or operations of the method may be performed in various sequences and/or simultaneously, and are not limited to a performing sequence shown in FIG. 8.

As shown in FIG. 8, the data encoding method 800 includes the following steps.

801: Perform side information feature extraction on a first feature map of current data, to obtain a side information feature map.

The data includes at least one of the following: image data, video data, motion vector data of the video data, audio data, point cloud data, or text data. Side information means that existing information Y is used to assist in encoding information X, so that an encoded length of the information X can be shorter. In other words, redundancy in the information X is reduced. The information Y is the side information. In this embodiment of this application, the side information is information that is extracted from the first feature map and that is used to assist in encoding and decoding the first feature map.

802: Perform quantization processing on the side information feature map, to obtain a first quantized feature map.

803: Perform entropy encoding on the first quantized feature map, to obtain a first bitstream of the current data.

A bitstream is a bitstream generated after encoding processing. The first bitstream is a bitstream obtained after the entropy encoding is performed on the first quantized feature map.

804: Perform scaling processing on a second feature map based on a scaling coefficient, to obtain a scaled feature map.

The scaling coefficient is obtained based on the first quantized feature map. In this embodiment, the first feature map and the second feature map are different feature maps obtained by performing feature extraction on the complete current data. For example, when the first feature map is different from the second feature map, for a specific method for obtaining the first feature map (y1 in FIG. 5B) and the second feature map (y2 in FIG. 5B), reference may be made to related descriptions of FIG. 5B. In this case, the scaling processing is scaling-down processing.

805: Perform quantization processing on the scaled feature map, to obtain a second quantized feature map.

806: Perform scaling processing on a first probability distribution parameter based on the scaling coefficient, to obtain a second probability distribution parameter.

The first probability distribution parameter is obtained based on the first quantized feature map. Alternatively, the first probability distribution parameter is a preset probability distribution parameter. The first probability distribution parameter is a matrix whose scale is the same as a scale of the second quantized feature map. Each of elements in the matrix represents a probability distribution parameter of one of elements in the second quantized feature map. A probability distribution parameter of each of the elements includes but is not limited to a mean and/or a variance. That is, one second quantized feature map corresponds to one mean matrix and/or one variance matrix.

807: Perform entropy encoding on the second quantized feature map based on the second probability distribution parameter, to obtain a second bitstream of the current data.

The second bitstream is a bitstream obtained after the entropy encoding is performed on the second quantized feature map.

In this solution, the entropy encoding is performed based on the first quantized feature map, to obtain the first bitstream of the current data. In addition, the scaling coefficient and the first probability distribution parameter may be obtained through estimation based on the first quantized feature map. In this way, the scaling processing may be performed on the second feature map based on the scaling coefficient, to obtain the scaled feature map. Then, the quantization processing is performed on the scaled feature map, to obtain the second quantized feature map. The scaling processing is performed on the first probability distribution parameter based on the scaling coefficient, to obtain the second probability distribution parameter. Finally, the entropy encoding is performed on the second quantized feature map based on the second probability distribution parameter, to obtain the second bitstream of the current data. The first bitstream and the second bitstream are used together as a total bitstream of the current data. A data encoding method in a conventional technology includes only a step of performing scaling processing on a feature map. In this solution, the second feature map and the first probability distribution parameter are scaled by using the same scaling coefficient, so that a matching degree between the second probability distribution parameter and the second quantized feature map is higher, thereby improving encoding accuracy of the second quantized feature map, that is, improving data compression performance. In some possible embodiments, the second feature map is a residual feature map that is of the current data and that is obtained based on a third feature map of the current data and the first probability distribution parameter, and the third feature map is obtained by performing feature extraction on the current data.

In this case, in this embodiment, the second feature map is a feature map obtained based on the current data, that is, a residual feature map. In this embodiment, the third feature map is a feature map that is obtained by performing feature extraction on the complete current data and that is different from the first feature map. A residual of the third feature map may be obtained based on the third feature map and the first probability distribution parameter. That is, a residual feature map may be obtained by subtracting the first probability distribution parameter from the third feature map, and the residual feature map is used as the second feature map of the current data. For example, when the first feature map is different from the third feature map, for a specific method for obtaining the first feature map (y1 in FIG. 5B) and the third feature map (y2 in FIG. 5B), reference may be made to related descriptions of FIG. 5B.

In this solution, during encoding, after the scaling processing is performed on the residual feature map of the current data to obtain the scaled feature map, the quantization processing is performed on the scaled feature map, so that a quantization loss of the scaled feature map is smaller. That is, an information loss of the second bitstream is smaller. This helps improve data quality of reconstructed data obtained through decoding based on the second bitstream. In addition, compared with an encoding network structure in a conventional technology, in this embodiment of this application, an encoding network structure including the scaling on the residual feature map is used, so that after training of an entire encoding network is completed, network parameters of the entire encoding network can be optimized, including a network for generating the first bitstream and a network for generating the second bitstream. Therefore, with the use of the encoding network structure in this embodiment of this application, a data amount of the total bitstream of the current data can be reduced, and encoding efficiency can be improved. In summary, the scaling on the residual feature map and the scaling on the first probability distribution parameter are combined, so that the data compression performance can be further improved.

Further, in some possible embodiments, the first feature map is the same as the third feature map. For example, for a specific method for obtaining the first feature map and the third feature map, reference may be made to related descriptions of FIG. 5A.

In some possible embodiments, the second feature map is a feature map obtained by performing feature extraction on the current data. The first feature map is the same as or different from the second feature map. For example, for a specific method for obtaining the first feature map and the second feature map, reference may be made to related descriptions of FIG. 5A.

In some possible embodiments, the first probability distribution parameter includes a mean and/or a variance.

In some possible embodiments, the data encoding method further includes:

sending the first bitstream and the second bitstream.

After the first bitstream and the second bitstream of the current data are obtained by using the data encoding method in this solution, the first bitstream and the second bitstream may be sent to another device according to a requirement, so that the another device can process the first bitstream and the second bitstream.

In some possible embodiments, the first bitstream and the second bitstream are stored in a form of bitstream file.

FIG. 9 is a schematic flowchart of a data decoding method according to an embodiment of this application. A data decoding method 900 is performed by a data decoder 30. The method shown in FIG. 9 is described as a series of steps or operations. It should be understood that the steps or operations of the method may be performed in various sequences and/or simultaneously, and are not limited to a performing sequence shown in FIG. 9.

As shown in FIG. 9, the data decoding method 900 includes the following steps.

901: Perform entropy decoding based on a first bitstream of current data, to obtain a third feature map.

902: Obtain a scaling coefficient based on the third feature map.

903: Perform entropy decoding on a second bitstream of the current data based on a first probability distribution parameter, to obtain a fourth feature map.

The first probability distribution parameter is a matrix whose scale is the same as a scale of the fourth feature map. Each of elements in the matrix represents a probability distribution parameter of one of elements in the fourth feature map. A probability distribution parameter of each of the elements includes but is not limited to a mean and/or a variance. That is, one fourth feature map corresponds to one mean matrix and/or one variance matrix.

904: Perform scaling processing on the fourth feature map based on the scaling coefficient, to obtain a fifth feature map. In this case, the scaling processing is scaling-up processing.

905: Obtain a sixth feature map based on the first probability distribution parameter and the fifth feature map.

906: Obtain reconstructed data of the current data based on the sixth feature map.

If a scaling and quantization operation is performed on a residual feature map during data encoding, a data amount of the first bitstream and the second bitstream in the data decoding method in this solution is less than that in a conventional technology. Therefore, a corresponding decoding processing amount is smaller, and this solution can effectively improve decoding efficiency. In addition, an information loss of the second bitstream is smaller, so that data quality of the reconstructed data obtained by using this solution is higher.

In some possible embodiments, the first feature map is the same as or different from the second feature map.

In some possible embodiments, the data includes at least one of the following: image data, video data, motion vector data of the video data, audio data, point cloud data, or text data.

In some possible embodiments, the first probability distribution parameter includes a mean and/or a variance.

In some possible embodiments, the data decoding method further includes:

obtaining the first probability distribution parameter based on the third feature map.

In some possible embodiments, the first probability distribution parameter is a preset probability distribution parameter.

FIG. 10 is a schematic flowchart of another data decoding method according to an embodiment of this application. A data decoding method 1000 is performed by a data decoder 30. The method shown in FIG. 10 is described as a series of steps or operations. It should be understood that the steps or operations of the method may be performed in various sequences and/or simultaneously, and are not limited to a performing sequence shown in FIG. 10.

As shown in FIG. 10, the data decoding method 1000 includes the following steps.

1001: Perform entropy decoding based on a first bitstream of current data, to obtain a third feature map.

1002: Obtain a scaling coefficient based on the third feature map.

1003: Perform scaling processing on a first probability distribution parameter based on the scaling coefficient, to obtain a second probability distribution parameter.

The first probability distribution parameter is a matrix whose scale is the same as a scale of a fourth feature map. Each of elements in the matrix represents a probability distribution parameter of one of elements in the fourth feature map. A probability distribution parameter of each of the elements includes but is not limited to a mean and/or a variance. That is, one fourth feature map corresponds to one mean matrix and/or one variance matrix.

1004: Perform entropy decoding on a second bitstream of the current data based on the second probability distribution parameter, to obtain the fourth feature map.

1005: Perform scaling processing on the fourth feature map based on the scaling coefficient, to obtain a fifth feature map. In this case, the scaling processing is scaling-up processing.

1006: Obtain reconstructed data of the current data based on the fifth feature map.

If scaling processing is performed on a second feature map and scaling processing is performed on the first probability distribution parameter during data encoding, correspondingly, during data decoding, the first probability distribution parameter and the fourth feature map are processed by using the same scaling coefficient, to ensure decoding accuracy of the fourth feature map. In addition, descaling processing is performed on the fourth feature map based on the scaling coefficient to obtain the fifth feature map, and the reconstructed data may be obtained based on the fifth feature map, so that precision and quality of the reconstructed data are higher. In summary, the scaling on the first probability distribution parameter and the descaling processing on the fourth feature map are combined, so that precision and quality in data decoding can be improved.

In some possible embodiments, the fourth feature map is a residual feature map, and obtaining the reconstructed data of the current data based on the fifth feature map includes:

adding the first probability distribution parameter to the fifth feature map, to obtain a sixth feature map; and obtaining the reconstructed data of the current data based on the sixth feature map.

If a scaling and quantization operation is performed on a residual feature map during data encoding, a data amount of the first bitstream and the second bitstream in the data decoding method in this solution is less than that in a conventional technology. Therefore, a corresponding decoding processing amount is smaller, and this solution can effectively improve decoding efficiency. In addition, an information loss of the second bitstream is smaller, so that data quality of the reconstructed data obtained by using this solution is higher.

In some possible embodiments, the first probability distribution parameter includes a mean and/or a variance.

In some possible embodiments, the data includes at least one of the following: image data, video data, motion vector data of the video data, audio data, point cloud data, or text data.

In some possible embodiments, the data decoding method further includes:

receiving the first bitstream and the second bitstream of the current data.

In some possible embodiments, the data decoding method further includes:

obtaining the first probability distribution parameter based on the third feature map.

In some possible embodiments, the first probability distribution parameter is a preset probability distribution parameter.

When functions of the method according to any one of embodiments of this application are implemented in a form of software functional unit and sold or used as an independent product, the functions may be stored in a computer-readable storage medium. Based on such an understanding, the data encoding method and/or the data decoding method in this application essentially or a part contributing to a conventional technology or a part of the technical solutions may be implemented in a form of computer program product. The computer program product is stored in a storage medium, and includes several instructions for instructing an electronic device to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

This application further provides a computer-readable storage medium. The storage medium stores a bitstream, and the bitstream is generated according to the data encoding method according to any one of the foregoing embodiments.

This application further provides a computer-readable storage medium, storing a bitstream including program code. When the program code is executed by one or more processors, a decoder is enabled to perform the data decoding method according to any one of the foregoing embodiments.

An embodiment of this application further provides a chip. The chip is used in an electronic device, the chip includes one or more processors, and the processors are configured to invoke computer instructions, to enable the electronic device to perform the data encoding method and/or the data decoding method according to any one of the foregoing embodiments.

An embodiment of this application further provides a computer program product including instructions. When the computer program product is run on an electronic device, the electronic device is enabled to perform the data encoding method and/or the data decoding method according to any one of the foregoing embodiments.

It may be understood that the computer storage medium, the chip, and the computer program product provided above are all configured to perform the data encoding method and/or the data decoding method according to any one of the foregoing embodiments. Therefore, for beneficial effects that can be achieved, refer to beneficial effects of the data encoding method and/or the data decoding method according to any one of the foregoing embodiments.

Persons of ordinary skill in the art may be aware that, units and algorithm steps in examples described with reference to embodiments disclosed in this specification can be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it shall not be considered that the implementation goes beyond the scope of this application.

In the several embodiments provided in this application, it should be understood that the disclosed apparatus and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one place, or may be distributed on a plurality of network units. Some or all of the units may be selected according to an actual requirement to achieve the objectives of the solutions of embodiments.

In addition, functional units in embodiments of this patent application may be integrated into one processing unit, or each of the units may exist alone physically, or two or more units may be integrated into one unit.

The foregoing descriptions are merely specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

The invention claimed is:

1. A data encoding method, comprising:
obtaining a side information feature map by performing side information feature extraction on a first feature map of current data;
obtaining a first quantized feature map by performing quantization processing on the side information feature map;
obtaining a first bitstream of the current data by performing entropy encoding on the first quantized feature map;

obtaining a scaled feature map by performing scaling processing on a second feature map based on a scaling coefficient, wherein the scaling coefficient is obtained based on the first quantized feature map;
obtaining a second quantized feature map by performing quantization processing on the scaled feature map;
obtaining a second probability distribution parameter by performing scaling processing on a first probability distribution parameter based on the scaling coefficient; and
obtaining a second bitstream of the current data by performing entropy encoding on the second quantized feature map based on the second probability distribution parameter.

2. The method according to claim 1, wherein the second feature map is a residual feature map of the current data and obtained based on a third feature map of the current data and the first probability distribution parameter, and the third feature map is obtained by performing feature extraction on the current data.

3. The method according to claim 2, wherein the first feature map is same as the third feature map.

4. The method according to claim 1, wherein the second feature map is obtained by performing feature extraction on the current data.

5. The method according to claim 4, wherein the first feature map is same as the second feature map.

6. The method according to claim 1, wherein the first probability distribution parameter includes a mean and/or a variance.

7. The method according to claim 1, further comprising: sending the first bitstream and the second bitstream.

8. The method according to claim 1, wherein the data comprises at least one of: image data, video data, motion vector data of the video data, audio data, point cloud data, or text data.

9. A data decoding method, comprising:
obtaining a third feature map by performing entropy decoding based on a first bitstream of current data;
obtaining a scaling coefficient based on the third feature map;
obtaining a second probability distribution parameter by performing scaling processing on a first probability distribution parameter based on the scaling coefficient;
obtaining a fourth feature map by performing entropy decoding on a second bitstream of the current data based on the second probability distribution parameter;
obtaining a fifth feature map by performing scaling processing on the fourth feature map based on the scaling coefficient; and
obtaining reconstructed data of the current data based on the fifth feature map.

10. The method according to claim 9, wherein the fourth feature map is a residual feature map, the fifth feature map is a scaled residual feature map, and obtaining the reconstructed data of the current data based on the fifth feature map comprises:
obtaining a sixth feature map by adding the first probability distribution parameter to the fifth feature map; and
obtaining the reconstructed data of the current data based on the sixth feature map.

11. The method according to claim 9, wherein the first probability distribution parameter includes a mean and/or a variance.

12. The method according to claim 9, wherein the data comprises at least one of: image data, video data, motion vector data of the video data, audio data, point cloud data, or text data.

13. The method according to claim 9, further comprising: receiving the first bitstream and the second bitstream of the current data.

14. A data decoder, comprising:
one or more processors; and
a memory operatively coupled to the one or more processors and storing a program that, when executed by the one or more processors, causes the data decoder to:
  obtain a side information feature map by performing side information feature extraction on a first feature map of current data;
  obtain a first quantized feature map by performing quantization processing on the side information feature map;
  obtain a first bitstream of the current data by performing entropy encoding on the first quantized feature map;
  obtain a scaled feature map by performing scaling processing on a second feature map based on a scaling coefficient, wherein the scaling coefficient is obtained based on the first quantized feature map;
  obtain a second quantized feature map by performing quantization processing on the scaled feature map;

obtain a second probability distribution parameter by performing scaling processing on a first probability distribution parameter based on the scaling coefficient; and
  obtain a second bitstream of the current data by performing entropy encoding on the second quantized feature map based on the second probability distribution parameter.

15. The decoder of claim 14, wherein the second feature map is a residual feature map of the current data and obtained based on a third feature map of the current data and the first probability distribution parameter, and the third feature map is obtained by performing feature extraction on the current data.

16. The decoder of claim 15, wherein the first feature map is same as the third feature map.

17. The decoder of claim 14, wherein the second feature map is obtained by performing feature extraction on the current data.

18. The decoder of claim 17, wherein the first feature map is same as the second feature map.

19. The decoder of claim 14, wherein the first probability distribution parameter includes a mean and/or a variance.

20. The decoder of claim 14, wherein the data comprises at least one of: image data, video data, motion vector data of the video data, audio data, point cloud data, or text data.

* * * * *